US012734848B2

(12) United States Patent
Richardson et al.

(10) Patent No.: US 12,734,848 B2
(45) Date of Patent: Sep. 15, 2026

(54) SYSTEM AND METHOD FOR TIRE INFLATOR MANAGEMENT

(71) Applicant: Aperia Technologies, Inc., Hayward, CA (US)

(72) Inventors: Brandon Richardson, Burlingame, CA (US); Bryan Duggan, Burlingame, CA (US); Thomas de Swiet, Burlingame, CA (US); Aaron Latzke, Burlingame, CA (US); Kevin Ciocia, Burlingame, CA (US); Kris Dobelstein, Burlingame, CA (US)

(73) Assignee: Aperia Technologies, Inc., Hayward, CA (US)

( * ) Notice: Subject to any disclaimer, the term of this patent is extended or adjusted under 35 U.S.C. 154(b) by 174 days.

(21) Appl. No.: 18/538,645

(22) Filed: Dec. 13, 2023

(65) Prior Publication Data

US 2024/0198736 A1 Jun. 20, 2024

Related U.S. Application Data

(60) Provisional application No. 63/432,561, filed on Dec. 14, 2022.

(51) Int. Cl.
*B60C 23/00* (2006.01)

(52) U.S. Cl.
CPC .................................. *B60C 23/002* (2013.01)

(58) Field of Classification Search
CPC . B60C 23/002; B60C 23/004; B60C 23/0408; B60C 23/0491
See application file for complete search history.

(56) References Cited

U.S. PATENT DOCUMENTS

| | | | |
|---|---|---|---|
| 789,024 | A | 5/1905 | Hibbard et al. |
| 1,358,524 | A | 11/1920 | Cooper |
| 1,448,248 | A | 3/1923 | Anthony |
| 1,484,914 | A | 2/1924 | Thomas |
| 2,089,297 | A | 8/1937 | Read et al. |
| 2,202,665 | A | 5/1940 | Metz |
| 2,211,935 | A | 8/1940 | Parker |
| 2,317,636 | A | 4/1943 | Parker |

(Continued)

FOREIGN PATENT DOCUMENTS

| | | | |
|---|---|---|---|
| BR | 102012023751 | A2 | 8/2014 |
| BR | 112015017312 | A2 | 7/2017 |

(Continued)

OTHER PUBLICATIONS

"Automatic Trailer Tire Inflation System", Fleet Maintenance, first downloaded 09-Nov. 2023, https://www.fleetmaintenance.com/in-the-bay/shop-equipment/product/10167762/hendrickson-international-automatic-trailer-tire-inflation-system.

(Continued)

*Primary Examiner* — Ramon A. Mercado
(74) *Attorney, Agent, or Firm* — Jeffrey Schox; Diana Lin

(57) ABSTRACT

In variants, the tire inflation system control method can include: determining a setpoint based on driving context for a vehicle; and controlling an inflator based on the setpoint. In variants, the tire inflation system can include a remote computing system and a set of wheel-end inflators mounted to the wheel ends of a vehicle and connected to the remote computing system, such as via a gateway local to the vehicle.

12 Claims, 20 Drawing Sheets

(56) References Cited

U.S. PATENT DOCUMENTS 2,415,618 A 2/1947 West
2,440,255 A 4/1948 Forrest
2,496,691 A 2/1950 Berry
2,899,907 A 8/1959 Becher
2,962,119 A 11/1960 White
3,012,820 A 12/1961 King
3,047,339 A 7/1962 Hamer
3,152,553 A 10/1964 Sverker
3,175,507 A 3/1965 Sverker
3,249,059 A 5/1966 Renn
3,400,074 A 9/1968 Grenci
3,452,801 A 7/1969 Fletcher et al.
3,511,294 A 5/1970 Bepristis et al.
3,532,449 A 10/1970 Garton
3,730,215 A 5/1973 Conery et al.
3,886,974 A 6/1975 Bjorklund
3,981,633 A 9/1976 Wall
4,018,579 A 4/1977 Hofmann
4,030,300 A 6/1977 Thompson
4,042,446 A 8/1977 Lawton
4,095,923 A 6/1978 Cullis
4,121,472 A 10/1978 Vural et al.
4,157,530 A 6/1979 Merz
4,180,985 A 1/1980 Northrup
4,256,971 A 3/1981 Griffith
4,291,235 A 9/1981 Bergey et al.
4,370,894 A 2/1983 Sturesson
4,460,006 A 7/1984 Kolze
4,536,668 A 8/1985 Boyer
4,606,710 A 8/1986 Maguire
4,637,152 A 1/1987 Roy
4,651,792 A 3/1987 Taylor
4,744,399 A 5/1988 Magnuson et al.
4,768,542 A 9/1988 Morris
4,807,487 A 2/1989 Seidl
4,819,593 A 4/1989 Bruener et al.
4,852,528 A 8/1989 Richeson et al.
4,893,459 A 1/1990 Orlando
4,895,199 A 1/1990 Magnuson et al.
4,910,148 A 3/1990 Sorensen et al.
4,922,984 A 5/1990 Dosjoub et al.
5,018,797 A 5/1991 Takata
5,052,456 A 10/1991 Dosjoub
5,173,038 A 12/1992 Hopfensperger et al.
5,201,968 A 4/1993 Renier
5,293,919 A 3/1994 Olney et al.
5,325,902 A 7/1994 Loewe et al.
5,342,177 A 8/1994 Cheng
5,370,711 A 12/1994 Audit et al.
5,375,984 A 12/1994 Wehling
5,388,470 A 2/1995 Marsh
5,409,049 A 4/1995 Renier
5,413,159 A 5/1995 Olney et al.
5,429,927 A 7/1995 Afseth et al.
5,468,129 A 11/1995 Sunden et al.
5,482,447 A 1/1996 Sunden et al.
5,495,879 A 3/1996 Cabestrero
5,512,439 A 4/1996 Hornes et al.
5,525,493 A 6/1996 Hornes et al.
5,538,062 A 7/1996 Stech
5,591,281 A 1/1997 Loewe
5,646,727 A 7/1997 Hammer et al.
5,667,606 A 9/1997 Renier
5,707,215 A 1/1998 Olney et al.
5,759,820 A 6/1998 Hornes et al.
5,846,354 A 12/1998 Winston et al.
5,894,757 A 4/1999 Sully
5,928,444 A 7/1999 Loewe et al.
5,941,692 A 8/1999 Olney et al.
5,941,696 A 8/1999 Fenstermacher et al.
5,947,696 A 9/1999 Baumgarten
6,092,545 A 7/2000 Bedore et al.
6,144,295 A 11/2000 Adams et al.
6,267,450 B1 7/2001 Gamble
6,360,768 B1 3/2002 Galler
6,463,798 B2 10/2002 Niekerk et al.
6,474,832 B2 11/2002 Murray
6,482,592 B1 11/2002 Lundeberg et al.
6,494,693 B1 12/2002 Sunden
6,663,348 B2 12/2003 Schwarz et al.
6,688,417 B2 2/2004 Hansell
6,742,386 B1 6/2004 Larson
6,744,356 B2 6/2004 Hamilton et al.
6,787,233 B1 9/2004 Molteberg et al.
6,814,547 B2 11/2004 Childers et al.
6,871,683 B2 3/2005 Cobb
6,984,702 B2 1/2006 Fonnum et al.
6,986,913 B2 1/2006 Fonnum et al.
6,994,136 B2 2/2006 Stanczak
7,013,931 B2 3/2006 Toit
7,029,576 B2 4/2006 Siegfriedsen
7,117,731 B2 10/2006 Hrabal
7,160,707 B2 1/2007 Fonnum et al.
7,173,124 B2 2/2007 Deggerdal et al.
7,217,762 B1 5/2007 Joergedal et al.
7,222,487 B1 5/2007 Hinkley
7,225,845 B2 6/2007 Ellmann
7,237,590 B2 7/2007 Loewe
7,255,323 B1 8/2007 Kadhim
7,302,837 B2 12/2007 Wendte
7,322,392 B2 1/2008 Hawes
7,357,164 B2 4/2008 Loewe
7,498,683 B2 3/2009 Landwehr
7,506,663 B2 3/2009 Thomas et al.
7,581,576 B2 9/2009 Nakano
7,607,465 B2 10/2009 Loewe
7,614,474 B2 11/2009 Yang
7,625,189 B2 12/2009 Cheng
7,704,057 B2 4/2010 Malbec et al.
7,748,422 B2 7/2010 Bol
7,763,689 B2 7/2010 Fonnum et al.
7,784,487 B2 8/2010 Arnett
7,784,513 B2 8/2010 Loewe
7,810,582 B2 10/2010 Webb
7,828,095 B2 11/2010 Murata et al.
7,828,101 B2 11/2010 Radtke et al.
7,847,421 B2 12/2010 Gardner et al.
7,856,871 B2 12/2010 Mancosu et al.
7,927,170 B2 4/2011 Bickerton et al.
7,931,061 B2 4/2011 Gonska et al.
7,931,817 B2 4/2011 Bilski
7,975,789 B2 7/2011 Murata
7,985,340 B2 7/2011 Almaasbak et al.
7,989,614 B2 8/2011 Deggerdal et al.
7,989,975 B2 8/2011 Clement et al.
8,004,104 B2 8/2011 Hench
8,022,561 B2 9/2011 Ciglenec et al.
8,038,987 B2 10/2011 Fonnum et al.
8,042,586 B2 10/2011 Losey et al.
8,083,503 B2 12/2011 Voltenburg et al.
8,110,351 B2 2/2012 Bosnes
8,113,254 B2 2/2012 Benedict
8,186,402 B2 5/2012 Eigenbrode
8,482,395 B2 7/2013 Rysenga et al.
8,534,335 B2 9/2013 Benedict
8,581,433 B2 11/2013 Sidenmark
8,646,426 B2 2/2014 Finkenbiner
8,747,084 B2 6/2014 Richardson et al.
8,763,661 B2 7/2014 Richardson
8,794,280 B2 8/2014 Flory et al.
8,801,910 B2 8/2014 Bazant et al.
8,955,566 B2 2/2015 Loewe
9,039,386 B2 5/2015 Richardson et al.
9,039,392 B2 5/2015 Richardson et al.
9,074,595 B2 7/2015 Richardson
9,145,887 B2 9/2015 Richardson
9,151,288 B2 10/2015 Richardson et al.
9,381,780 B2 7/2016 Hinque
9,428,016 B2 8/2016 Keeney et al.
9,434,218 B2 9/2016 Root
9,597,932 B2 3/2017 Dieckmann et al.
9,604,157 B2 3/2017 Richardson
9,682,599 B1 6/2017 Hinque et al.
9,789,739 B1 10/2017 Hennig

(56) References Cited

U.S. PATENT DOCUMENTS 9,994,081 B2 6/2018 Becker
10,052,834 B2 8/2018 Losey
10,137,745 B2 11/2018 Mcclellan
10,144,254 B2 12/2018 Richardson
10,166,821 B2 1/2019 Hennig
10,183,535 B1 1/2019 Chemali
10,189,320 B2 1/2019 Hinque
10,239,364 B2 3/2019 Hennig
10,245,908 B2 4/2019 Richardson
10,358,005 B2 7/2019 Mcclellan
10,406,869 B2 9/2019 Richardson
10,422,660 B2 9/2019 Creech et al.
10,513,156 B2 12/2019 Hrabal
10,576,794 B2 3/2020 Lee
10,625,544 B2 4/2020 Balistreri
10,814,683 B2 10/2020 Richardson
10,850,576 B2 12/2020 Richardson
11,199,186 B2 12/2021 Slesinski et al.
11,209,289 B2 12/2021 Creech et al.
11,353,137 B2 6/2022 Scopesi
11,370,189 B2 6/2022 Tsiberidis
11,453,258 B2 9/2022 Richardson
11,584,173 B2 2/2023 Richardson
11,642,920 B2 5/2023 Ciocia et al.
2001/0000305 A1 4/2001 Murray
2002/0092346 A1 7/2002 Niekerk et al.
2003/0021693 A1 1/2003 Schwarz et al.
2003/0109657 A1 6/2003 Fonnum et al.
2004/0007302 A1 1/2004 Hamilton et al.
2004/0050760 A1 3/2004 Siegfriedsen
2004/0216827 A1 11/2004 Stanczak
2005/0014001 A1 1/2005 Fonnum et al.
2005/0067207 A1 3/2005 Radtke et al.
2005/0126273 A1 6/2005 Hrabal
2005/0147822 A1 7/2005 Fonnum et al.
2005/0239068 A1 10/2005 Bosnes
2006/0055174 A1 3/2006 Landwehr
2006/0102268 A1 5/2006 Loewe
2006/0118224 A1 6/2006 Ellmann
2006/0169349 A1 8/2006 Nakano
2007/0017595 A1 1/2007 Arno et al.
2007/0018458 A1 1/2007 Martinez
2007/0020130 A1 1/2007 Malbec et al.
2007/0040135 A1 2/2007 Dyer et al.
2007/0068238 A1 3/2007 Wendt
2007/0107822 A1 5/2007 Loewe
2007/0148022 A1 6/2007 Cheng
2007/0151648 A1 7/2007 Loewe
2007/0175831 A1 8/2007 Almaasbak et al.
2008/0003110 A1 1/2008 Isono
2008/0017256 A1 1/2008 Thomas et al.
2008/0035399 A1 2/2008 Murata et al.
2008/0093814 A1 4/2008 Filippi et al.
2008/0135151 A1 6/2008 Loewe
2008/0149404 A1 6/2008 Yang
2008/0154691 A1* 6/2008 Wellman ................ B60K 35/81
705/7.26
2008/0156406 A1 7/2008 Breed
2008/0174120 A1 7/2008 Gardner et al.
2008/0190535 A1 8/2008 Concu
2008/0247883 A1 10/2008 Yokomachi et al.
2008/0289739 A1 11/2008 Bol
2008/0300396 A1 12/2008 Deggerdal et al.
2008/0308330 A1 12/2008 Murata
2009/0008942 A1 1/2009 Clement et al.
2009/0032158 A1 2/2009 Rudolf et al.
2009/0048733 A1 2/2009 Isono
2009/0087325 A1 4/2009 Voltenburg et al.
2009/0126997 A1 5/2009 Webb
2009/0151835 A1 6/2009 Manning
2009/0188310 A1 7/2009 Mancosu et al.
2009/0206024 A1 8/2009 Bilski
2009/0256532 A1 10/2009 Ciglenec et al.
2009/0301575 A1 12/2009 Arnett
2009/0311941 A1 12/2009 Bickerton et al.
2010/0102564 A1 4/2010 Hench
2010/0147429 A1 6/2010 Gonska et al.
2010/0243121 A1 9/2010 Eigenbrode
2011/0018275 A1 1/2011 Sidenmark
2011/0061621 A1 3/2011 Finkenbiner
2011/0146867 A1 6/2011 Benedict
2011/0146868 A1 6/2011 Losey et al.
2011/0203710 A1 8/2011 Hinojosa et al.
2011/0308953 A1 12/2011 Bazant et al.
2012/0020822 A1 1/2012 Richardson et al.
2012/0073716 A1 3/2012 Benedict
2013/0068361 A1 3/2013 Flory et al.
2013/0220813 A1 8/2013 Anand et al.
2013/0251552 A1 9/2013 Richardson
2013/0251553 A1 9/2013 Richardson et al.
2013/0276902 A1 10/2013 Medley et al.
2014/0000755 A1 1/2014 Richardson et al.
2014/0010680 A1 1/2014 Richardson
2014/0023518 A1 1/2014 O'Brien et al.
2014/0102621 A1 4/2014 Losey
2014/0186195 A1 7/2014 Richardson et al.
2014/0260969 A1 9/2014 Richardson
2014/0379171 A1* 12/2014 Kim ...................... B60W 50/00
701/2
2015/0007920 A1 1/2015 Tanno
2015/0059950 A1 3/2015 Hinque
2015/0101723 A1 4/2015 Keeney et al.
2015/0126222 A1* 5/2015 Ignatin .................... G08G 1/09
455/456.3
2015/0218987 A1 8/2015 Minato et al.
2015/0239309 A1 8/2015 Root
2015/0360522 A1 12/2015 Dieckmann et al.
2015/0367693 A1 12/2015 Richardson et al.
2016/0008739 A1 1/2016 Richardson
2016/0107491 A1 4/2016 Lin
2016/0167465 A1 6/2016 Hinque
2016/0203652 A1* 7/2016 Throop .................. G07C 5/008
701/1
2016/0288592 A1 10/2016 Becker
2017/0015147 A1 1/2017 Mcclellan
2017/0015156 A1 1/2017 Mcclellan
2017/0015159 A1 1/2017 Richardson
2017/0036162 A1 2/2017 Hoeldrich
2017/0072752 A1 3/2017 Lin
2017/0076511 A1* 3/2017 Busch-Sorensen .... G07C 5/008
2017/0166017 A1 6/2017 Hinque
2017/0166018 A1 6/2017 Hinque et al.
2017/0299077 A1 10/2017 Jabcon et al.
2018/0001718 A1 1/2018 Hennig
2018/0022170 A1 1/2018 Hennig
2018/0022187 A1* 1/2018 Connell ............. B60H 1/00985
701/2
2018/0065429 A1 3/2018 Richardson
2018/0072112 A1 3/2018 Lee
2018/0104994 A1 4/2018 Lin et al.
2018/0170125 A1 6/2018 Woodley
2018/0178598 A1 6/2018 Woodley
2018/0207575 A1 7/2018 Dunning et al.
2018/0231395 A1 8/2018 Creech et al.
2018/0250991 A1 9/2018 Hrabal
2018/0326932 A1 11/2018 Chemali
2019/0023085 A1 1/2019 Chemali
2019/0063414 A1 2/2019 Slesinski et al.
2019/0118593 A1 4/2019 Hrabal
2019/0126693 A1 5/2019 Balistreri
2019/0271407 A1 9/2019 Scopesi
2019/0368897 A1 12/2019 Creech et al.
2020/0070450 A1 3/2020 Tsiberidis
2020/0130435 A1 4/2020 Root et al.
2020/0130436 A1 4/2020 Root et al.
2020/0130437 A1 4/2020 Root et al.
2020/0134942 A1 4/2020 Root et al.
2020/0207162 A1* 7/2020 Stopczynski ......... B60C 23/002
2020/0226529 A1* 7/2020 Davidson ......... G06Q 10/06398
2021/0016615 A1 1/2021 Richardson
2021/0061028 A1 3/2021 Da Deppo et al.
2021/0125428 A1* 4/2021 Tedesco ............... G07C 5/0808

(56) References Cited

U.S. PATENT DOCUMENTS

| | | | |
|---|---|---|---|
| 2022/0161611 | A1 | 5/2022 | Hrabal |
| 2022/0169084 | A1 | 6/2022 | Van Ginderen et al. |

FOREIGN PATENT DOCUMENTS

| | | | |
|---|---|---|---|
| CA | 2440255 | A1 | 3/2005 |
| CN | 2202665 | Y | 7/1995 |
| CN | 2496691 | Y | 6/2002 |
| CN | 2635411 | Y | 8/2004 |
| CN | 101415946 | A | 4/2009 |
| CN | 101844491 | A | 9/2010 |
| CN | 102963222 | A | 3/2013 |
| CN | 103009938 | A | 4/2013 |
| CN | 103171160 | A | 6/2013 |
| CN | 103770579 | A | 5/2014 |
| CN | 103879244 | A | 6/2014 |
| CN | 102015334 | B | 10/2014 |
| CN | 102963222 | B | 5/2015 |
| CN | 102963221 | B | 6/2015 |
| CN | 105365504 | A | 3/2016 |
| CN | 105365505 | A | 3/2016 |
| CN | 103009938 | B | 6/2016 |
| CN | 103879243 | B | 3/2017 |
| CN | 107816564 | A | 3/2018 |
| CN | 108349337 | A | 7/2018 |
| CN | 108349338 | A | 7/2018 |
| CN | 108349340 | A | 7/2018 |
| CN | 109070663 | A | 12/2018 |
| CN | 110114231 | A | 8/2019 |
| CN | 107816564 | B | 11/2019 |
| CN | 108349338 | B | 6/2020 |
| CN | 108349337 | B | 11/2020 |
| CN | 108349340 | B | 3/2021 |
| CN | 109070663 | B | 8/2021 |
| DE | 1042446 | B | 10/1958 |
| DE | 4042446 | A1 | 7/1992 |
| DE | 19739144 | A1 | 3/1999 |
| DE | 102012106549 | A1 | 5/2014 |
| DE | 202017104222 | U1 | 8/2017 |
| DE | 102019121377 | A1 | 2/2021 |
| EP | 2572903 | A1 | 3/2013 |
| EP | 2572903 | B1 | 4/2016 |
| EP | 2951036 | B1 | 12/2016 |
| EP | 3296131 | A1 | 3/2018 |
| EP | 3332223 | A1 | 6/2018 |
| EP | 3442813 | A1 | 2/2019 |
| EP | 3296131 | B1 | 6/2019 |
| EP | 3332223 | B1 | 7/2019 |
| EP | 3535142 | A1 | 9/2019 |
| EP | 3442813 | B1 | 3/2020 |
| EP | 3535142 | B1 | 9/2021 |
| GB | 530005 | A | 12/1940 |
| GB | 2089297 | A | 6/1982 |
| JP | 2005231573 | A | 9/2005 |
| JP | 2010149073 | A | 7/2010 |
| JP | 2011203230 | A | 10/2011 |
| JP | 2014177168 | A | 9/2014 |
| KR | 20070098639 | A | 10/2007 |
| KR | 20080039578 | A | 5/2008 |
| KR | 20140003969 | U | 6/2014 |
| KR | 20170029520 | A | 3/2017 |
| KR | 102256754 | B1 | 5/2021 |
| RU | 112098 | U1 | 1/2012 |
| WO | 2009034321 | A1 | 3/2009 |
| WO | 2009110001 | A1 | 9/2009 |
| WO | 2012012617 | A2 | 1/2012 |
| WO | 2017064106 | A1 | 4/2017 |

OTHER PUBLICATIONS

"Complete tire performance data, seamlessly integrated to your Samsara Fleet Management Solution", Samsara Pressure Pro, first downloaded Oct. 24, 2023, https://pressurepro.us/samsara/.

"Continental Designs Tomorrow's Tire", Continental Press Release, Sep. 11, 2019.

"Leveraging Near Field Communication (NFC) to Connect with BLE Smart Sensors", DigiKey, Nov. 16, 2017, https://www.digikey.com/en/articles/leveraging-nfc-to-connect-with-ble-smart-sensors.

"The Future of the Tire Management, Meet the New ContiConnect Digital Tire Monitoring", Continental Tire The Americas, LLC, first downloaded Oct. 24, 2024.

"Tiremaxx Tire Pressure Control Systems", Hendrickson, first downloaded 25-Oct. 2023, https://www.hendrickson-intl.com/products/tiremaax/tiremaax.

Butcher, Lawrence , "Continental launches cloud-based tire monitoring system", Continental TPMS & Electronics, Dec. 9, 2020, https://www.tiretechnologyinternational.com/news/tpms-electronics/continental-launches-cloud-based-tire-monitoring-system-for-fleet-management.html.

* cited by examiner

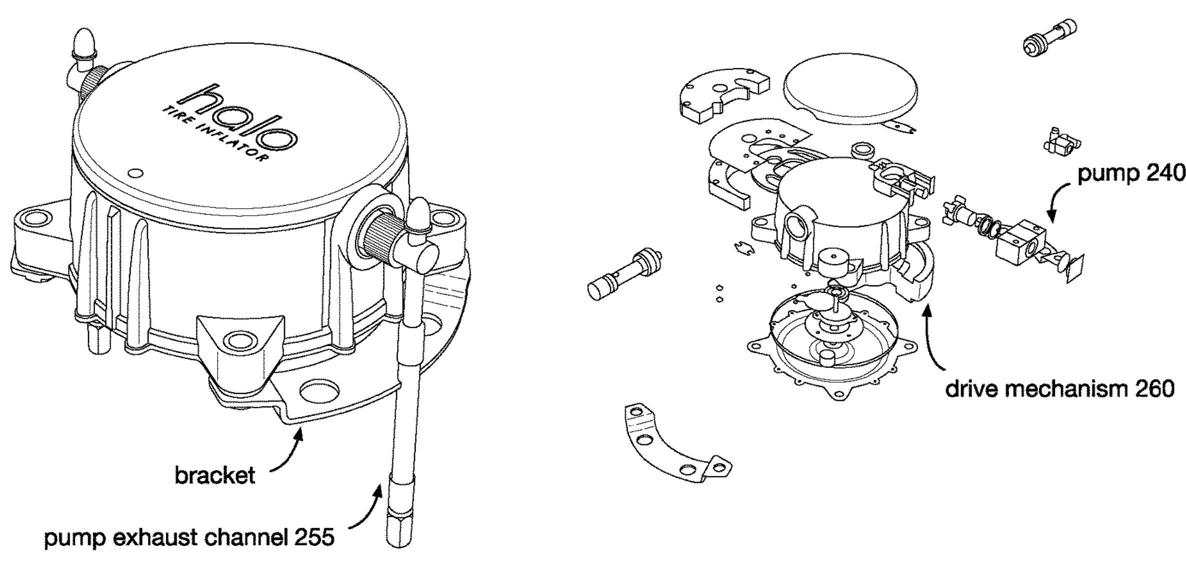
FIGURE 8A
FIGURE 8B
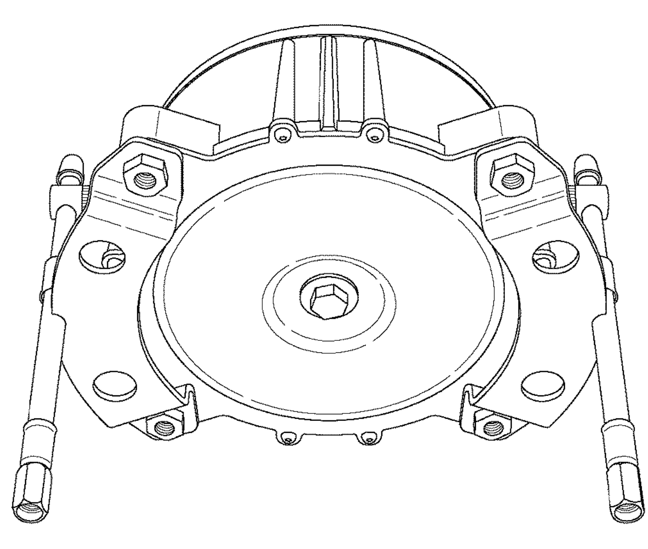
FIGURE 8C

SYSTEM AND METHOD FOR TIRE INFLATOR MANAGEMENT

CROSS-REFERENCE TO RELATED APPLICATIONS

This application claims the benefit of U.S. Provisional Application No. 63/432,561 filed 14 Dec. 2022, which is incorporated in its entirety by this reference.

TECHNICAL FIELD

This invention relates generally to the tire inflation field, and more specifically to a new and useful system and method in the tire inflation field.

BRIEF DESCRIPTION OF THE FIGURES

FIGS. 8A, 8B, and 8C are rendered views of an example tire inflator.

DETAILED DESCRIPTION

The following description of the embodiments of the invention is not intended to limit the invention to these embodiments, but rather to enable any person skilled in the art to make and use this invention.

1. Overview

Figure 1A:
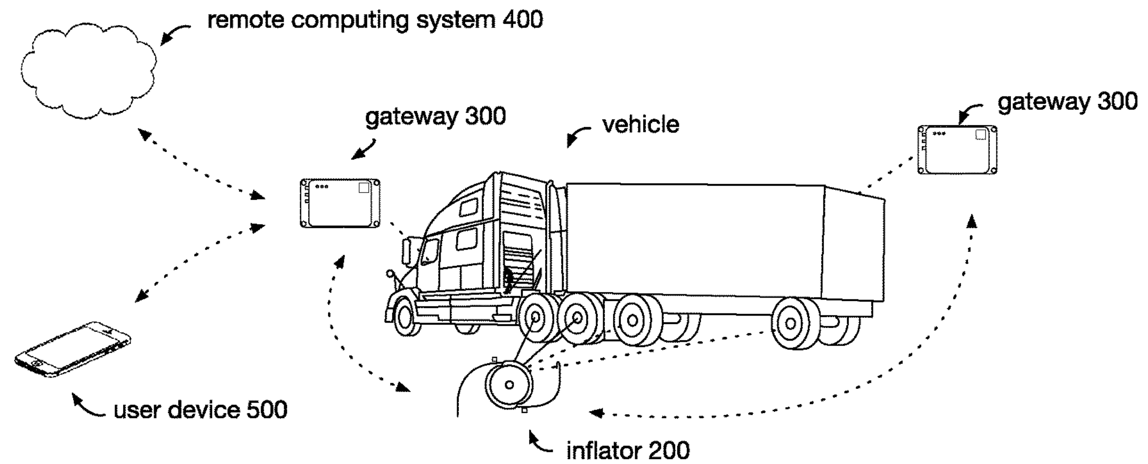
FIG. 1A is a schematic representation of an example of the system in use.
Figure 1B:
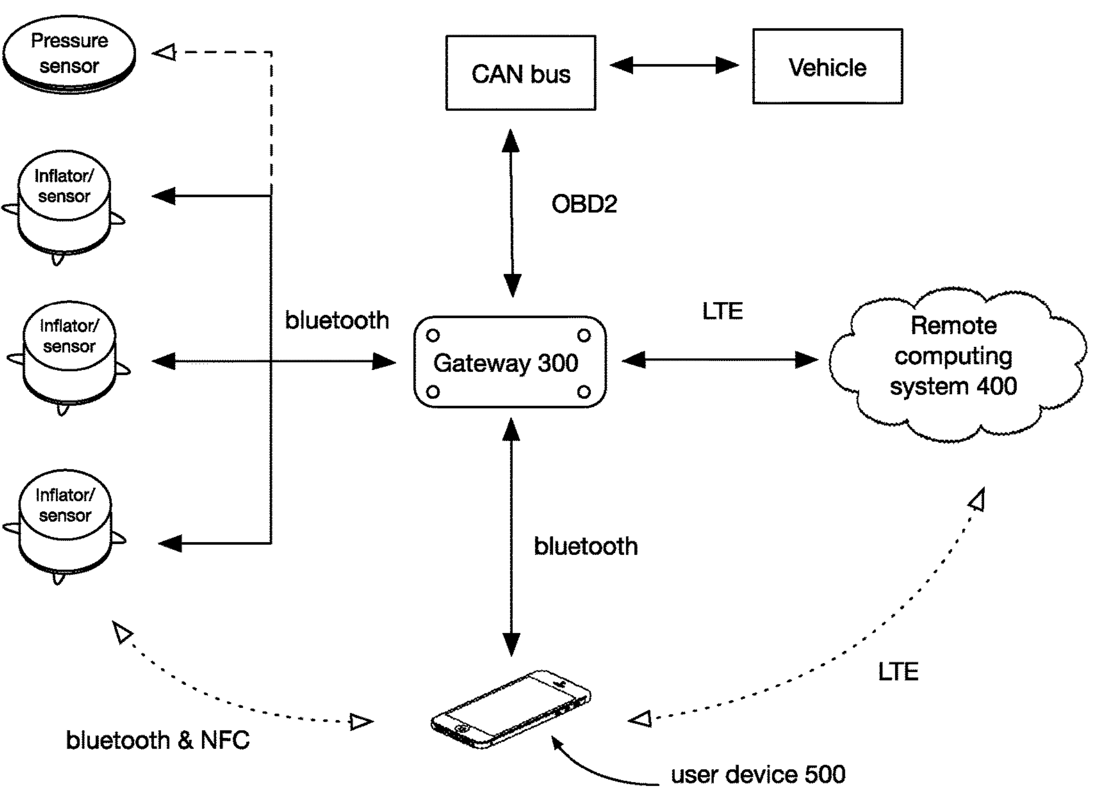
FIG. 1B is a schematic representation of an example of communications pathways for the system.

As shown in FIG. 1A and FIG. 1B, a connected tire inflation system can include a set of inflators 200 configured to mount to a vehicle, a gateway 300 connected to the set of inflators 200, a remote computing system 400, and/or any other suitable elements. The system can optionally further be used with and/or include a user device 500 (e.g., smartphone application). The system functions to selectively inflate and monitor tires 10 on one or more vehicles.

Figure 2:
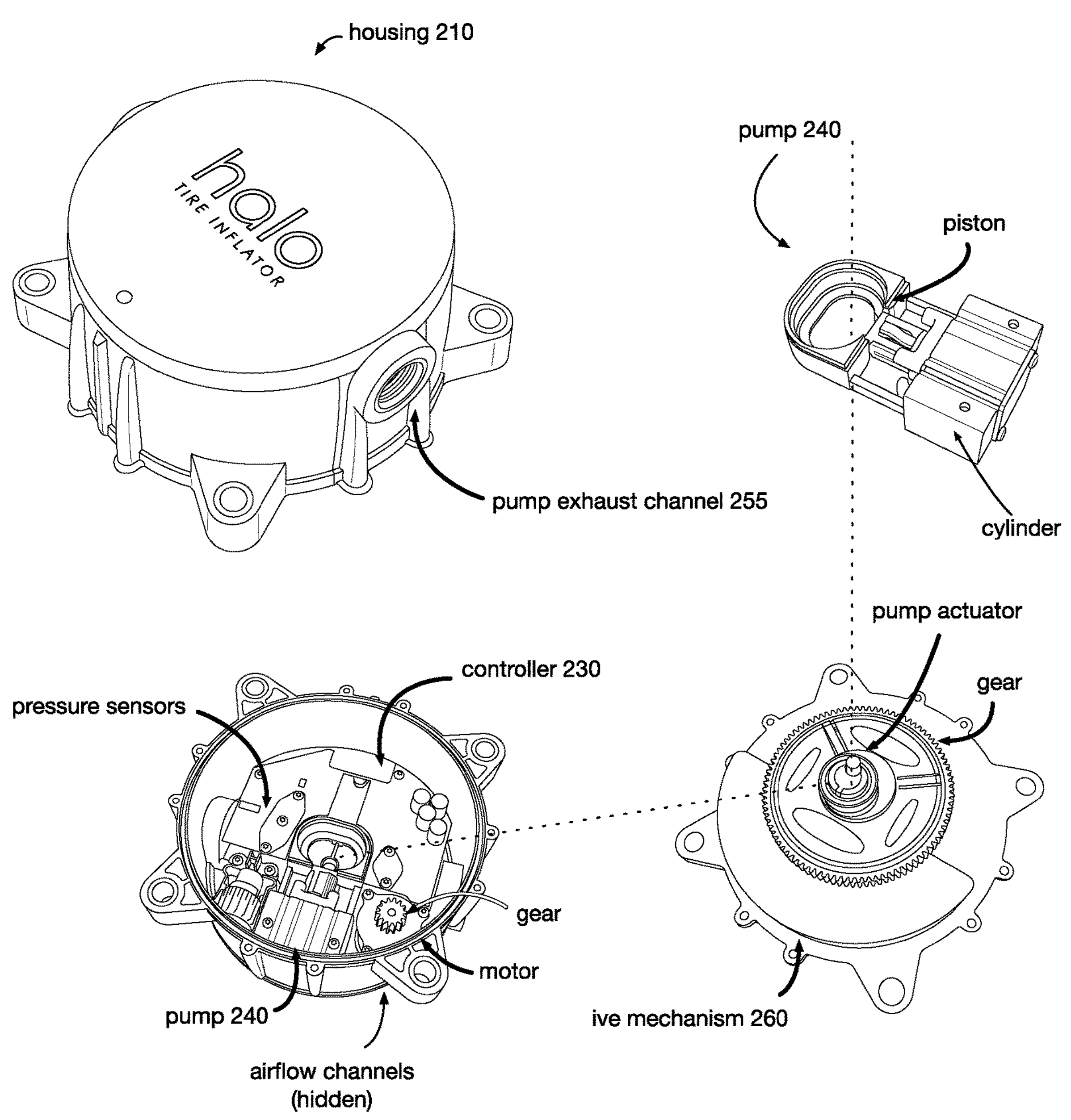
FIG. 2 is a rendered view of the interior and exterior of an embodiment of a tire inflator.

In an illustrative example, the system can include a set of inflators 200 mounted to a vehicle's wheel ends, a gateway 300 connected to the vehicle, and a remote computing system 400. Each inflator 200 can include: a housing 210 statically mounted to the wheel hub; a pump 240 statically mounted to the housing 210 (e.g., driven by a hanging mass); a set of fluid pathways fluidly connecting the pump outlet to a tire 10; a set of pressure sensors fluidly connected to the pathways; an optional generator statically mounted to the housing 210, coupled to the mass (e.g., by an epicyclic gear set, with a sun gear statically coupled to the hanging mass and a planetary gear connected to the generator rotor), and configured to regeneratively convert mass rotation relative to the generator into electrical energy; an optional battery electrically connected to the generator; an inflator controller 230 configured to control pump operation (e.g., by controlling hanging mass coupling to the pump 240) and/or control tire inflation (e.g., by controlling pump operation or by controlling a valve between the pump 240 or a reservoir and the tire 10); a set of low-power and/or short-range communication modules 220 (e.g., NFC, Bluetooth; including one or more opposing antennas 270); an optional set of sensors; and/or any other suitable elements (e.g., example shown in FIG. 2), or be otherwise configured. In variants, all or a portion of the fluid pathways can be directly connected to the tire interior (e.g., without an intervening valve); alternatively, the pathway-tire interior connection can be regulated by a set of valves. In this example, each inflator 200 can be communicatively connected to the gateway 300 and/or remote computing system 400. In examples, the inflator 200 can receive operation parameters (e.g., setpoints) from the remote computing system 400 and/or gateway 300, and/or communicate inflator state and/or tire state to the remote computing system 400 and/or gateway 300.

In this example, the gateway 300 can include a set of low-power and/or short range communication modules configured to communicate with a set of inflators 200 (e.g., a local set of paired inflators 200); a set of high-power communication modules (e.g., Wi-Fi, LTE, etc.) configured to communicate with a remote computing system 400; an optional set of vehicle connections (e.g., CAN bus connections, OBD II, etc.) configured to communicate with the vehicle (e.g., the vehicle ECUs); a user interface (e.g., user output, user input); and/or any other suitable set of components. In variants, the gateway 300 can perform higher-power computations (e.g., leak detection, tire wear monitoring, etc.), function as the interface between the inflators 200 and external systems (e.g., user devices 500, remote computing systems 400, etc.), forward data between local systems (e.g., inflators 200, etc.) and/or external systems (e.g., remote computing systems 400, user devices 500, etc.), and/or perform other functionalities.

In this example, the remote computing system 400 can be configured to receive vehicle parameters and/or driving context data from the gateways 300, determine setpoints for the inflators 200, receive inflator 200 and/or tire data from the inflators 200 (e.g., via the gateways 300) of one or more vehicles, perform higher-level analytics (e.g., timeseries analyses, such as leak detection, pumping trends, etc.) based on the data (e.g., inflator parameters, tire data, vehicle parameters, driving context data, etc.), generate user notifications based on the analytics (e.g., failure notifications, maintenance notifications, etc.), learn models based on historical fleet data, manage fleets of inflator systems, manage user preferences (e.g., pressure setpoints per vehicle, per fleet, per tire type, per tire, per inflator 200, etc.), and/or perform other functionalities. In variants, the tire pressure setpoints can be manually determined (e.g., by a fleet manager, by a user, etc.), learned (e.g., based on historical vehicle or tire performance for a given pressure setpoint and driving context), automatically determined based on a vehicle or inflator's driving context (e.g., using a model, a set of heuristics, a lookup table, etc.), and/or otherwise determined.

However, the system can be otherwise configured.

2. Technical Advantages

Variants of the technology can afford various benefits and/or advantages over conventional system.

First, variants of the system can offer a user greater control over their vehicle's tire pressure. This system allows a user to both set and modify tire pressure setpoint for each inflator system. This enables a user to order a standard inflator system without prespecifying a fixed setpoint, and this enables a user to swap inflators 200 between vehicles.

Second, variants of the system can adapt to the current vehicle operating conditions (e.g., climate, road conditions, etc.). In a first example, the system avoids over-inflation of the tires 10 by automatically adapting the setpoint to operating conditions and/or shutting off the pump 240. In examples, this can be performed automatically, wherein the remote computing system 400 can automatically determine a target setpoint for each tire 10 based on the current or anticipated driving context (e.g., vehicle location, load, ambient environment, tire make and model, etc.) and provide an updated setpoint to the tire inflator 200 to satisfy.

Third, variants of the system can enable continuous tire monitoring (e.g., even when parked) and analytics (e.g., leak detection) with and/or without using a vehicle's power supply. In variants, this can be enabled by dynamically adjusting communication rates, process execution, and/or communication modalities based on the vehicle operation state and/or the inflator's state of charge.

Fourth, the system can be smaller and more lightweight, which can lower operating costs and enables the system to operate on lower weight class vehicles. Additionally, the system can be easier to mount with different bracket types and the system leaves room on the wheel to which other accessories can mount.

Fifth, variants of the system can offer easier connectivity over existing tire pressure management systems because sensors (e.g., tire pressure sensor) can be integrated into the inflator 200 directly, and discovery and pairing or data broadcasting can be performed automatically using low-power, short range communication methods.

However, the system and method can offer further technical benefits than those described here.

3. System

The tire inflation and monitoring system can include and/or be used with: information, a set of inflators 200, a gateway 300, set of sensors, a remote computing system 400, an optional user device 500, and/or any other suitable components. The system can be used with the wheels of one or more vehicles, wherein each wheel can include a wheel hub and a tire 10.

Vehicles can include tractors, trailers, tractor-trailer systems, trucks, buses, cars, vans, and/or other suitable vehicle type.

Information & Data.

Information functions to represent data about the system, system context, and/or other data. Information can be sampled, measured, calculated (e.g., analysis results), predicted (e.g., based on other information), received, or otherwise determined. Information can be encrypted or not encrypted. Information can include vehicle parameters, tire parameters, inflator parameters, operation parameters, environmental parameters, fleet information, sensor observations, temporal information, load parameters, system communication rates, security information, driving context, instructions, remote computing system data, connection information, and/or other types of information.

Vehicle parameters can include vehicle type, vehicle location, vehicle age, vehicle operation state, unloaded vehicle weight, vehicle speed, fuel efficiency, fuel availability, vehicle ID, vehicle components (e.g., whether the vehicle has a trailer attached, etc.), and/or other suitable types of parameters relating to a vehicle. For a vehicle that includes multiple connected vehicle types or components (e.g., a tractor-trailer), parameters can be shared between the two vehicles or can be unique to each vehicle. Vehicle parameters can be static (e.g., for at least a drive session, across multiple drive sessions, etc.), inherent, and/or otherwise static or dynamic. Vehicle parameters can be measured by a sensor or set of sensors, be calculated, be inferred, and/or be otherwise determined. Vehicle parameters can be based on raw sensor data, processed sensor data, stored vehicle information (e.g., other vehicle parameters), and/or other suitable types of information. Vehicle parameters can be stored at the inflator, gateway, remote computing system, and/or another suitable location.

Tire parameters can include tire specification (e.g., type, make, model, manufacturer, etc.), tire age, manufacturer pressure setpoints, tire tread depth, tire ID, whether a tire 10 has an inflator 200 and/or sensors mounted to the tire 10, and other suitable types of parameters relating to a vehicle. Tire parameters are preferably static parameters or inherent parameters (e.g., age, tread depth, etc.), but can alternatively be dynamic parameters that vary over time and/or are measured.

Inflator parameters can include inflator type, inflator functionality (e.g., whether the inflator 200 is functional), inflator maximum flow rates and pressures, current or historical inflator operation state (e.g., pumping or not pumping, state of charge, reservoir pressure, pump rate, etc.), sensor types and locations on the inflator 200 and/or wheel, inflator 200, inflator connection status to gateway 300, inflator pump duty cycle, inflator ID, and/or other static and/or dynamic parameters relating to an inflator 200.

Operation parameters function to control inflator operation. Operation parameters can include tire pressure setpoint, pump pressure setpoint, pump rate, communication rates, over-the-air updates, pump controls, and/or other suitable parameters relating to inflator operation.

Environmental parameters can include weather (e.g., rain, fog, snow, etc.), ambient temperature, ambient pressure, ambient humidity, windspeed, and/or other environmental parameters. Environmental parameters can be determined by onboard sensors and/or processing systems on the inflator 200, vehicle, or gateway 300, can be received from a third party, can be received from a remote computing system 400 and/or can be matched with a vehicle based on location (e.g., weather data, road quality data, etc.), and/or otherwise determined.

Fleet information can include fleet ID, ID of vehicles in the fleet, inflator IDs, tractor-trailer pairings, vehicle-tire pairings, load-vehicle pairings, a driver schedule per vehicle, a maintenance schedule per vehicle, fleet admin IDs, fleet admin permissions (e.g., what pieces of information each admin is allowed to change), fleet tire pressure setpoints (e.g., setpoints for different tire make/model, seasons, location, speed, weather, etc.), fleet tire pressure determination rulesets and/or models rules (e.g., equations, lookup tables, models, etc.), fleet risk tolerance (e.g., risk thresholds; relative importance of trip length variance, trip length, tire cost, etc.), locations of vehicles within the fleet, maintenance locations, technician information, historical fleet data from vehicles within the fleet (e.g., historical driving contexts; historical setpoints per inflator, per tire, and/or per vehicle; historical performance, such as fuel efficiency, tire longevity, tire pressure, adverse tire events, blowouts, crashes, skidding, etc.), current data from vehicles within the fleet, inflator operation states (e.g., inflator operation instruction prediction models trained on and/or learned from historical fleet data, such as setpoint models), notification models (e.g., when drivers, fleet admin, and/or other users should be notified based on current fleet vehicle parameters), and/or other suitable types of information relating to fleets and vehicles within fleets.

Sensor observations can include processed or non-processed data from sensors mounted to any suitable component on the vehicle (e.g., inflator 200, tire 10, wheel, trailer, tractor, cab, gateway 300, etc.). Sensor observations can include cold inflation pressure, instantaneous pressure (e.g., the pressure inside the tire 10), acceleration, speed, velocity, humidity (e.g., inside the pump 240 or tire 10 or outside the tire 10), temperature (e.g., inside the pump 240 or tire 10 or outside the tire 10), air flow rate through the inflator 200, tire tread depth, vibrations, air spring pressure, images, video, and/or other suitable types of sensor observations. Sensors can sample measurements of any suitable measurement target on the vehicle.

Temporal information can be determined by a time-recording component (e.g., RTC module, GPS module, NTP server, etc.) or can be received from another component. Temporal information can include time of the day, time of the year, day of the week, temporal rulesets and limitations (e.g., a truck can travel for a maximum number of hours in a day), and/or other suitable types of temporal information.

Load parameters can describe the load carried by a vehicle. Load parameters can include whether the vehicle carries a load, load weight, load monetary value, load time value, maximum trip length, load resilience (e.g., how well can the load withstand a bumpy road and/or a blowout, etc.), air spring pressure, and/or other suitable types of information relating to a load. Load parameters can be determined by the fleet manager, manually determined, measured (e.g., by sensors onboard the vehicle), inferred (e.g., from changes in the tire pressure, etc.), and/or otherwise determined.

System communication rates can include sensor data transmission rates, inflator communication rates, gateway communication rates, gateway-inflator communication rate, gateway-remote computing system communication rate, remote computing systems communication rate, user device communication rates and/or other suitable communication rates for other system components.

Security information can include authorization keys, authentication keys, and/or other suitable types of security information. Security information can be symmetric, asymmetric, rotating, device-based, hardware-based, time-based, role-based, and/or can have any other suitable attribute.

Driving context functions to represent the context in which the vehicle is operating. Driving context can include: vehicle parameters, tire parameters, inflator parameters, location parameters, load parameters, and/or other parameters. Driving context preferably excludes tire measurements (e.g., tire pressure, tire temperature, etc.) or inflator measurements (e.g., inflator pressure), but can additionally or alternatively include tire and/or inflator measurements. Driving context can additionally or alternatively include vehicle operation state (e.g., whether vehicle is moving, vehicle state of charge, etc.), or exclude vehicle operation state. In examples, driving context can include vehicle make and model, tire make and model, tire age, intrinsic or static tire parameters, vehicle geolocation (e.g., current location, past location, predicted location, etc.), time of day, fuel consumption (current, historical, projected, etc.), vehicle kinematics (e.g., vehicle speed, acceleration, etc.), vehicle load, environmental parameter values (e.g., predicted or measured), and/or other suitable types of driving context. Driving context can include information relating to other entities (e.g., availability and location of tire technicians, inflator repair technicians, gas stations, rest stops, and/or other third party entities). However, driving context can be otherwise defined. Driving context is preferably determined by the gateway and/or by the remote computing system but can additionally or alternatively be determined by the inflation system, manually determined, and/or otherwise determined.

Inflator parameters can include tire pressure, the tire pressure setpoint (e.g., target tire pressure), pump pressure setpoints (e.g., pump pressure target, the target pressure of air leaving the pump 240), pump temperature, pump flow rate, pump frequency (e.g., pump actuation rate, pump on/off or connect/disconnect frequency, etc.), the tire leak rate, and/or other suitable inflator parameters.

Gateway parameters can include vehicle speed, vehicle operation state (e.g., on, idling, moving, parked, off, etc.), gateway operation state, vehicle fuel level, vehicle type, and/or other suitable information relating to the gateway 300 and/or vehicle.

Remote computing system data can include weather data, road quality data, fleet data, historical fleet tire performance, fleet preferences, historical fleet fuel efficiency, technician locations, setpoint models, and/or other suitable information relating to the remote computing system 400 and/or fleet.

Connection information can include information relating to an existing or possible connection between any two components (e.g., between the gateway 300 and inflator 200, between the inflator 200 and user device 500, between the user device 500 and gateway 300, etc.). Connection information can include authentication information, authorization information, encryption information, security credentials, and/or other information. Examples of connection information include: connection preferences, component ID, security information, connection type, connection confirmation (e.g., connection approval or rejection from a user), a component whitelist, a component blacklist, and/or other suitable information relating to a connection between two components.

Information can include observations, instructions, analysis results, and/or other suitable class of information. Observations can be information about any component or set of components of the system. Observations can include raw data (e.g., sensor data), processed data, component characteristics, system relationships, and/or other types of observations. In an example, observations can include sensor observations, inflator parameters, vehicle parameters, environmental information, and/or other suitable types of information. Instructions location, location determined based on IMU data). Analysis results can be wholly determined by one component but can alternatively be cooperatively determined by multiple components. Analysis results can include alerts. In an example, analysis results can include alerts, tire leak rate, driving context, remote computing system data, and/or other suitable types of analysis results. Analysis results can be determined based on any type of analysis, including tire tread depth can include any controls for a system component or information for a user. Instructions can include instructions to set a parameter value (e.g., a user manually assigning a tire type or assigning an inflator to a gateway). In an example, instructions can include controls, updates, models, operation parameters, setpoints, security information, connection information, and/or other suitable types of instructions. Analysis results can be any form of calculated data (e.g., weather data determined based on a gateway, tire health, predictive maintenance, tire specification, leak detection, tire performance assessment, and/or other suitable types of analyses performed on tire parameters, sensor measurements, and/or other suitable types of information. However, different types of information can be classified in any other suitable class.

However, the system and/or method can be used with any other suitable set of information.

Inflator.

The inflator 200 functions to inflate tires 10, collect data, and optionally run analytics on collected and/or received data.

The inflator 200 can be passive, active, and/or otherwise controlled. Each vehicle preferably includes multiple inflators 200 (e.g., one for each tire 10, one for each axle end, one for each wheel end, etc.), but can additionally or alternatively include a single inflator 200 (e.g., a central tire inflator system) or any other suitable number of inflators 200. The inflator 200 is preferably mounted (e.g., removably mounted, permanently mounted, etc.) to the wheel (e.g., the hub of the wheel), but can additionally or alternatively be mounted to the axle, to the vehicle body, to the tire 10 (e.g., within the tire 10), and/or to any other suitable portion of the vehicle. Each inflator 200 preferably inflates a single tire 10 but can additionally or alternatively inflate a pair of tires 10 (e.g., tires on the same wheel end), a subset of vehicle tires 10 (e.g., the drive tires, all tires sharing an axle, etc.), all vehicle tires 10, and/or any other suitable set of tires 10 on a vehicle.

Figure 5:
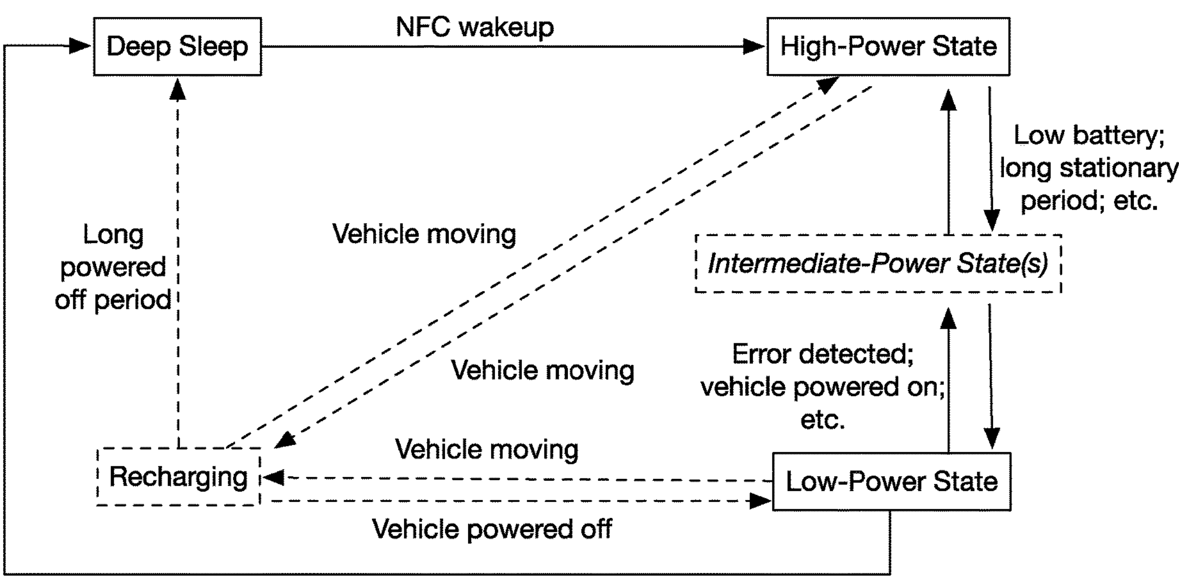
FIG. 5 is a schematic representation of an example embodiment of tire inflator operation states and transitions.

The inflator 200 can be operable between different inflator operation states. Examples of states include pre-wakeup, wakeup, recharging, regular in-use, high-power operation state, low-power operation state, intermediate-power operation state, deep sleep, recharging, hibernation, and/or other suitable inflator operation states (e.g., example shown in FIG. 5). Different inflator operation states can be determined based on a ruleset (e.g., when a predetermined set of conditions or measurement values are met), using a classifier, and/or otherwise determined. Different inflator operation states can correspond to different inflator communication rates, analysis rates, inflator power state, individual component operation states (e.g., only the NFC component is on in hibernation state; all powered components are on when the inflator 200 is in the high-power state, etc.), pumping rates, pump flow rates, pump pressure setpoints, tire pressure setpoints, and/or other inflator parameters. In a specific example, an inflator 200 in a "high-power" state can transmit information at a high inflator communication rate, decrease the communication rate when the inflator enters an intermediate power state, and further decrease the inflator communication rate when the inflator 200 enters a "low-power" or "dormant" state. In this specific example, the "high-power" state can be when a generator produces a current above a threshold value (e.g., above a threshold current magnitude), the "intermediate-power" state can be when a generator produces a current with a magnitude above a second threshold value and below the threshold value, and a "low-power" state can be when a generator produces a current below the second threshold value; however, the high and low power states can be otherwise defined. In another specific example, the inflator can transition from the high power state to the intermediate power state, then to the low-power state, when the inflator battery is low, the vehicle or inflator has been stationary for more than a threshold period of time, and/or when other conditions are met. In this example, the inflator can transition from the low power state to the intermediate power state, then the high power state, when an error is detected, when the vehicle is powered on, when vehicle or inflator motion is detected, and/or when other conditions are met.

Inflator operation state can be determined based on power regeneration (e.g., the amount of power or electrical energy being generated or harvested at a generator of the inflator 200), pumping (e.g., whether the inflator is pumping, pump rate, etc.), wheel rotation (e.g., whether wheel is moving, rotation rate, etc.), vehicle motion (e.g., whether vehicle is moving or accelerating, velocity, etc.), vehicle state of charge (e.g., battery state of charge, generator power generation rate, etc.), responsive to a trigger (e.g., Bluetooth, NFC tag, sensor signal, etc.), receipt of an instruction from gateway 300 or user device 500 (e.g., activate, switch vehicle operation state, etc.), and/or any other suitable parameters.

The inflator operation state and/or other operation parameters can be controlled by the inflator 200 (e.g., an inflator controller 230 onboard the inflator 200 or communicatively connected to the inflator 200). In a first variant, the inflator controller 230 receives sensor data from onboard sensors, determines the target inflator operation state (e.g., determines a high-power state based on vehicle motion), and operates the inflator components based on the inflator operation state (e.g., to meet a target setpoint or operation state). In a second variant, the gateway 300 determines an inflator operation state based on vehicle parameters and/or inflator parameters and sends the inflator operation state to the inflator 200, which operates the inflator components based on the inflator operation state. In this variant, the gateway 300 can determine a target inflator operation state for each inflator 200 independently, for all inflators 200 on the vehicle, for all inflators 200 on a wheel end, for all inflators 200 on an axle, or for another set of inflators 200. In a third variant, the user device 500 can set the inflator operation state and directly send the inflator operation state to the inflator 200 via the user device. In a fourth variant, the inflator controller 230 receives a target inflator operation state (e.g., based on driving context, historical performance of the fleet, tire 10, or vehicle, etc.), determined by a remote endpoint (e.g., remote computing system 400, user device 500, etc.), optionally determines the current inflator operation state, and controls inflator operation to satisfy the target inflator operation state (e.g., by controlling valve position, drive mechanism 260 engagement with the pump 240, whether the pump 240 or drive mechanism 260 is on or off, etc.). However, the inflator controller 230 can otherwise control inflator operation.

The inflator 200 can preferably be electrically controlled but can alternatively be mechanically controlled, manually controlled, or otherwise controlled. The inflator 200 can preferably be removably mounted to the wheel but can alternatively be permanently mounted to the wheel. In an example, the inflator 200 can be swapped between tires 10. The inflator 200 can be mounted to the wheel hub, valve stem, wheel rim, and/or another wheel component. The inflator 200 can be fluidly connected to more than one tire 10 through a set of pump exhaust channel 255. A pump exhaust channel 255 can be through a hose and/or another suitable connection type.

The inflator 200 can have a diameter of 50 mm, 100 mm, 200 mm, 300 mm, 400 mm, 500 mm, within any open or closed range bounded by any of the aforementioned values, and/or any other suitable range. The inflator 200 can weigh 2 lbs, 3 lbs, 4 lbs, 5 lbs, 6 lbs, 8 lbs, 10 lbs, within any open or closed range bounded by any of the aforementioned values, and/or any other suitable range.

A vehicle can preferably have one inflator 200 per wheel end but can alternatively have one inflator 200 per drive axle, one inflator 200 per steering axle, one inflator 200 per tire (e.g., two inflators 200 for a dual tire wheel end), and/or any other suitable configuration of tires 10. Preferably, the inflators 200 are fluidly isolated from inflators 200 and/or tires 10 mounted to other wheel ends but can additionally or alternatively be fluidly connected to the inflators and/or tires mounted to other wheel ends.

Figure 17:
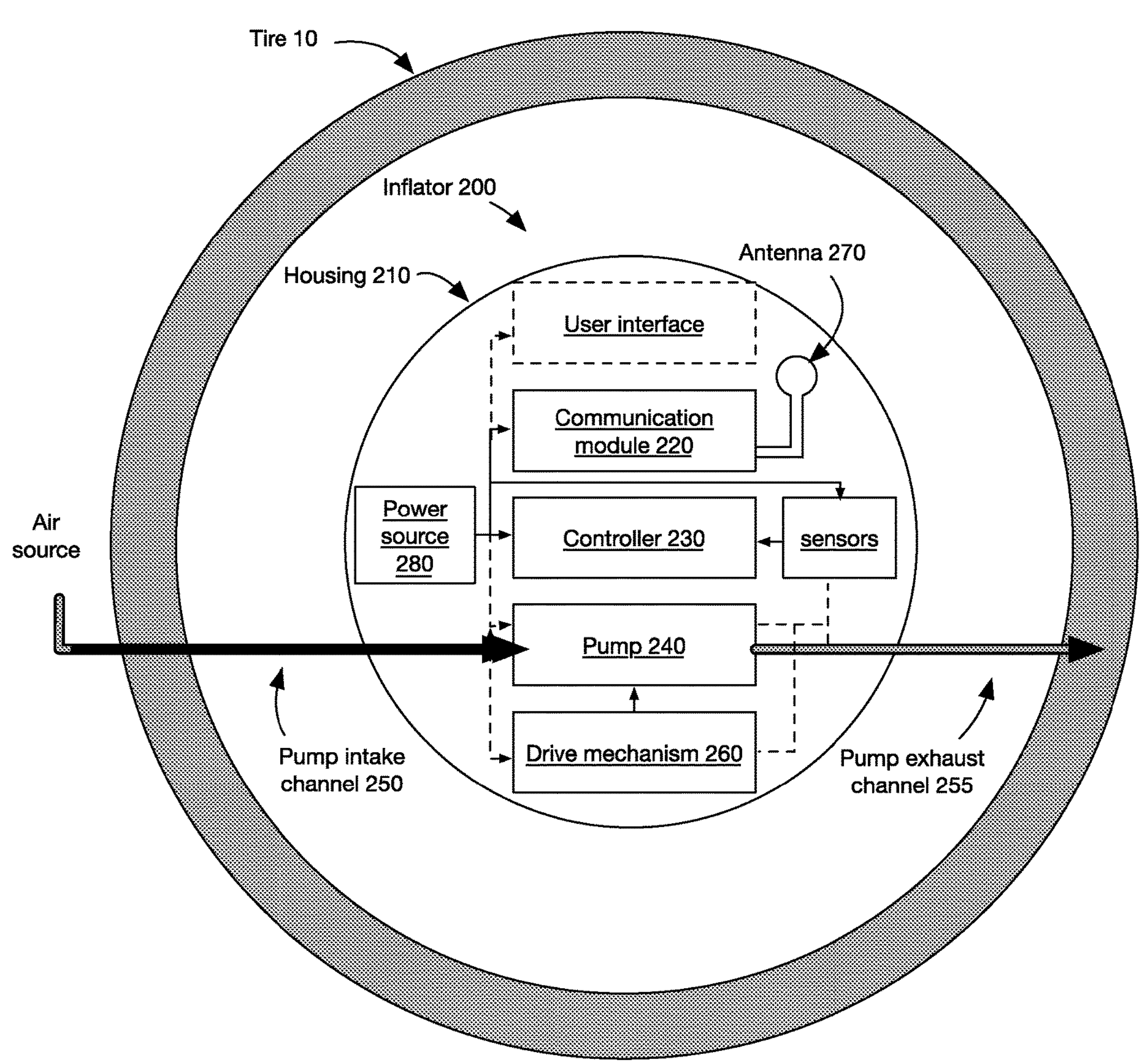
FIG. 17 is a schematic representation of a variant of the inflator.

The inflator 200 can include a housing 210, pump 240, inflator communication module 220, power source 280, inflator user interface, inflator controller 230, water management system, valves, sensors, and/or other suitable inflator components (e.g., example shown in FIG. 17).

Figure 3:
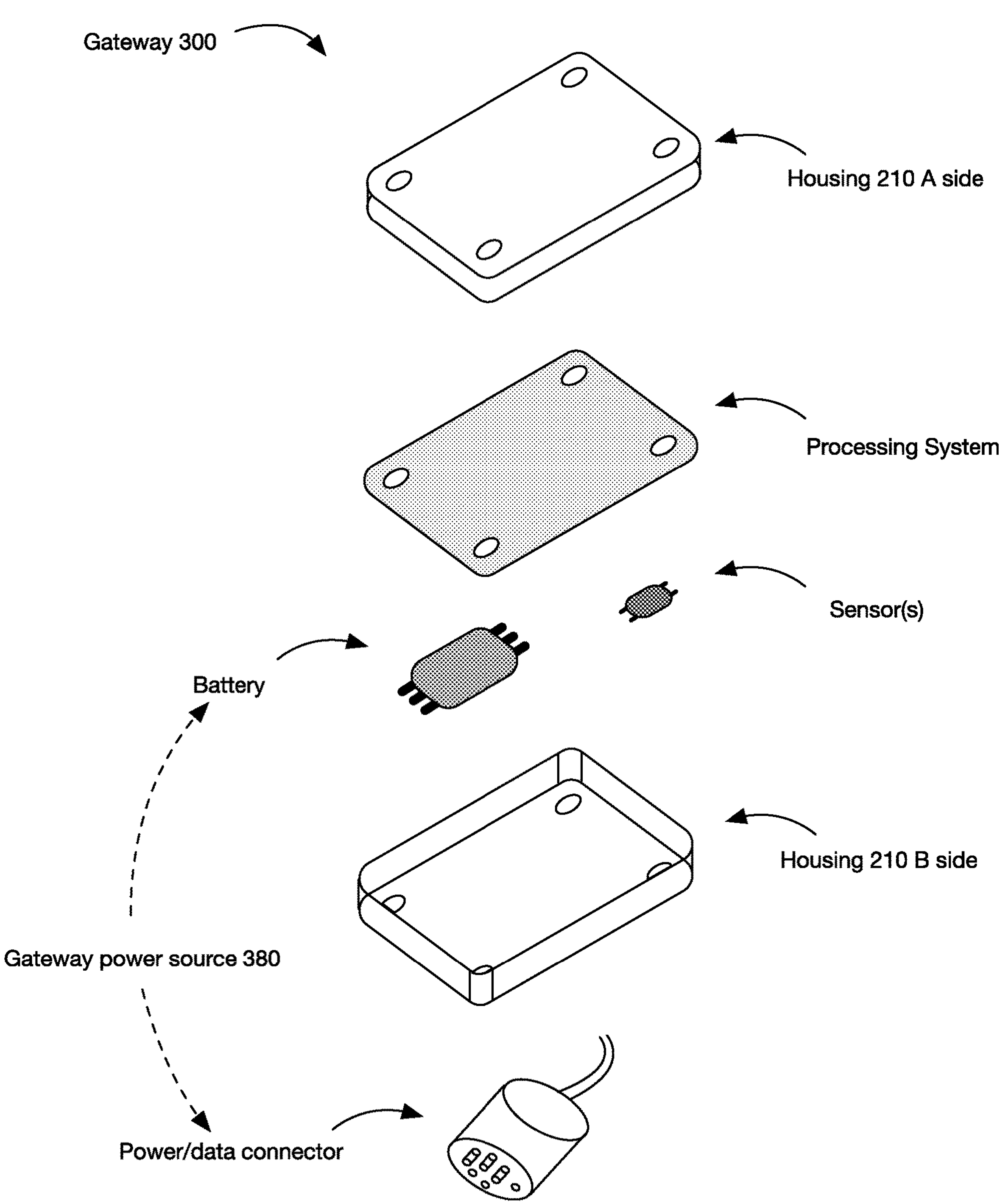
FIG. 3 is an illustrative view of an example gateway device.

The housing 210 functions to protect inflator components and mount the inflator components to the wheel. The housing 210 can be statically mounted to the hub, tire 10, axle, and/or another part of a wheel. The housing 210 can enclose inflator components partially or wholly. The housing 210 can define a cavity for inflator components and/or a pressure reservoir (e.g., examples shown in FIG. 3, FIG. 8B, and FIG. 8C). The housing 210 can define a fluid path connecting an air source (e.g., a reservoir, outdoor air, etc.), pump intake channel 250, pump exhaust channel 255 (e.g., a hose) fluidly connected to the tire 10 and/or any other suitable feature. However, the housing 210 can be otherwise configured.

The optional power source 280 functions to provide power to components within the inflator 200. The inflator 200 can include an onboard power source 280 but can alternatively include no power source. Preferably the power source 280 is not electrically connected to the vehicle, but alternatively the power source 280 can be connected to a vehicle power source (e.g., a vehicle battery) or can be the vehicle power source. The power source 280 can be preferably located within the housing 210 but can alternatively be mounted to the outside of the housing 210 or to the vehicle. The power source 280 can be a generator, chargeable or non-rechargeable battery, power connection, and/or another suitable power source 280.

The inflator power source 280 preferably includes two power sources (e.g., one generator and one secondary power source) but can alternatively include one generator, one battery, and/or any suitable number of power sources.

A generator can function to generate power for the inflator 200. The generator can convert relative rotation between a hanging mass (e.g., rotatably coupled to the housing 210) and the housing 210 and/or wheel into electricity. Additionally or alternatively, the generator can convert relative rotation of a wheel relative to the axle or vehicle into electrical or mechanical energy.

In a variant, the generator includes a stator mounted to the housing 210 interfacing with (e.g., surrounding) a rotor statically attached to a planetary gear enmeshed with a sun gear, crown gear, and/or bevel gear fixed to the hanging mass and configured to rotate about the sun gear, crown gear, and/or bevel gear central axis relative to the housing 210. Additionally or alternatively, the rotor can be mounted to the housing 210 and the rotor can be statically coupled to the gearset. The stator and rotor can rotate relative to one another during the whole wheel rotation or part of the wheel rotation. The generator can selectively harvest energy at all times (e.g., when pumping), when not pumping, selectively, responsive to control instructions, and/or at any other suitable time. However, the generator can be alternatively configured.

A secondary power source can function to store power and supply power during wheel stasis and/or optionally wheel motion. The secondary power source can be a battery, capacitor, supercapacitor, and/or another power source type. In a first variant, the secondary power source can supply power when the inflator is in a particular operation state (e.g., parked). The inflator controller 230 can determine how much power to draw from the secondary power source (e.g., responsive to a low electrical current coming from the generator, responsive to an inflator operation state, and/or responsive to a determined or received vehicle operation state, the inflator 200 can switch to the secondary power source). In a second variant, the secondary power source can supply power at all times but can be recharged by the generator. However, the secondary power source can provide power (or not provide power) at any other suitable time. The secondary power source can be rechargeable, or non-rechargeable (e.g., replaceable).

In variants, the system can alternate between power sources. In a first variant, the system can use battery power at all times. In a second variant, the system can alternate energy sources between the battery and generator depending on vehicle operation state, inflator operation state, and/or wheel rotation. In a first example, the inflator 200 on a parked vehicle draws energy from the battery but switches to a generator when the vehicle starts moving. In a second example, when a generator is generating too much energy, the inflator 200 can switch its power source 280 back to the battery. However, the system can otherwise switch power sources.

The pump 240 of the inflator 200 can function to pressurize air and force the pressurized air into a tire and/or reservoir. The system preferably includes one pump 240 per inflator 200 but can alternatively include two pumps and/or any other suitable number of pumps. The pump 240 can be located within the housing 210 but can alternatively be located outside of the housing 210. The pump 240 can preferably not be shared between inflators 200, but alternatively multiple inflators 200 can use the same pump 240 (e.g., a pump 240 mounted to the vehicle and fluidly connected to the inflators 200 via a rotating joint). The inflator 200 can be fluidly connected to the tires 10 via the pump exhaust channel 255 (e.g., a hose). The pump 240 can include a pressure release valve.

The pump 240 can be driven by a drive mechanism 260 that imparts an actuating force. In a first variant, relative motion of a wheel and a free hanging mass rotatably attached to the wheel can drive the pump 240. In this variant, the hanging mass (e.g., the drive mechanism 260) can rotate relative to the wheel and to the housing 210. The hanging mass can be statically connected to an actuating interface (e.g., a cam, an asymmetrically mounted bearing, etc.), wherein the actuating interface is connected to an actuating element of the pump 240 (e.g., the piston, a pump cylinder, generator, etc.). As the hanging mass rotates relative to the pump 240 mounted to the housing 210, the actuating interface also rotates relative to the pump 240, thus driving actuation of the pump's actuating element.

In this variant, the generator harvesting energy from relative motion between the hanging mass and the wheel can control the free hanging mass, and thus, pump actuation. In a first example, the power source 280 can apply a current to the generator stator, causing the rotor-attached gear to resist or amplify eccentric mass rotation. This resistance can put the eccentric mass into a free spin with the wheel, thus speeding, slowing, or stopping pump actuation. Optionally, the hanging mass can split to create a stable free spin. In a second example, during component failure (e.g., no battery, no connection to gateway 300, etc.), the generator can resist the motion of the hanging mass, sending the hanging mass into a free spin by default. However, pump actuation can be controlled by disengaging the actuating interface from the pump 240, disengaging the actuating interface from the drive mechanism 260, pressurizing the pump 240 (e.g., to exceed the torque applied by the actuating interface on the pump's actuating element), and/or be otherwise controlled.

In examples, the inflator 200 and/or pump 240 can be any of those described in U.S. application Ser. No. 13/188,400 filed 21 Jul. 2011, U.S. application Ser. No. 13/187,949 filed 21 Jul. 2011, U.S. application Ser. No. 13/797,811 filed 12 Mar. 2013, U.S. application Ser. No. 13/797,826 filed 12 Mar. 2013, U.S. application Ser. No. 13/797,846 filed 12 Mar. 2013, U.S. application Ser. No. 14/204,674 filed 11 Mar. 2014, U.S. application Ser. No. 15/280,737 filed 29 Sep. 2016, U.S. application Ser. No. 15/696,816, filed 6 Sep. 2017, U.S. application Ser. No. 18/510,463 filed 15 Nov. 2023, U.S. application Ser. No. 17/085,010 filed 30 Oct. 2020, U.S. application Ser. No. 17/388,340 filed 29 Jul. 2021, and/or U.S. application Ser. No. 18/127,334, filed 28 Mar. 2023, each of which is incorporated in its entirety by this reference. However, the pump 240 can be a central tire inflation system; an inflation system built into the tire structure; or any other suitable pump 240 or inflator 200.

In a second variant, the drive mechanism 260 can include an active mechanism (e.g., a pneumatic actuator, solenoid, motor, electric actuator, and/or another active actuation mechanism) that actively actuates the pump. The active drive mechanism can be powered by the inflator power source 280 or another power source (e.g., the vehicle power source).

In a third variant, the pump 240 can be electrically or mechanically driven by a power generation unit drawing power from relative motion of the axle and hub and/or wheel. The power generation unit can be the inflator power source 280 or a different power source. Preferably, the power generation unit can be outside of the housing 210 (e.g., behind the wheel, at the axle), but the power generation unit can be located elsewhere. The pump 240 can preferably be at the wheel end, opposite the power generation unit on the wheel, but the pump 240 can alternatively be located elsewhere. In a first example, the power generation unit can be an ovular cam around the wheel axle with a reciprocating follower driving pump actuation. In a second example, the power generation unit can be a gear attached to a rotor meshing with a ring gear around the axle. However, the pump 240 can be any of the pump 240 systems described in U.S. application Ser. No. 16/694,840, filed 25 Nov. 2019, and/or any other suitable pump 240.

However, the pump 240 can be driven by any other suitable active or passive mechanism.

Examples of pumps that can be used include diaphragm pumps, piston pumps, and/or other pumps.

However, the pump 240 can be otherwise configured.

The inflator communication module 220 on the inflator 200 functions to connect with and communicate with endpoints. Endpoints can be the gateway 300, other inflators 200, a user device 500, and/or a remote computing system 400. The inflator communication module 220 can be mounted to the housing 210 (preferably inside the housing 210) but can alternatively be mounted to the wheel, the axle, and/or to any other suitable portion of the inflator 200, wheel, vehicle, and/or other system. Each inflator 200 preferably includes one inflator communication module 220 but can alternatively include multiple inflator communication modules 220. Each inflator communication module 220 is preferably associated with a single inflator 200 but can additionally or alternatively service multiple inflators 200. A inflator communication module 220 can include a transmitter, receiver, transceiver, processing unit, at least one antenna 270, and/or any other suitable set of components. In an example, the inflator communication module 220 includes two antennas 270 arranged in opposing directions (e.g., along the same axis)

The inflator 200 can include different inflator communication modules 220 for different communication methods (e.g., BLE, internet, NFC, etc.) but can alternatively use the same inflator communication module 220 for different communication methods. Low power communication methods include NFC, Bluetooth, BLE, Bluetooth coded PHY, and/or other suitable low power communication methods. High power communication methods can include UWB, Wi-Fi, cellular, and/or other suitable high power communication methods. The inflator 200 can include one or more inflator communication modules 220 of each type or class (e.g., one or more low-power inflator communication modules 220, etc.). Each inflator communication module 220 can include one or more antennas 270. When the inflator communication module 220 includes multiple antennas 270, the antennas 270 can be arranged: in parallel, in series, opposing each other, at a predetermined angle to each other, and/or in any other suitable configuration.

Inflator communication modules 220 (and/or the associated inflator(s) 200) can be associated with one or more tire IDs, wheel ends, axles, vehicle components (tractor, trailer, etc.), vehicles, inflator IDs, fleets, and/or other entities. Associations can be stored on the inflator 200, gateway 300, remote computing system 400, user device 500, and/or another suitable system component. Associations can be established by: the remote computing system 400 (e.g., received from the user), gateway 300 (e.g., via pairing to inflators 200), the inflator 200 itself (e.g., via pairing to the gateway 300 or other inflators 200), the user device 500 (e.g., received from user), and/or otherwise established.

Figure 7:
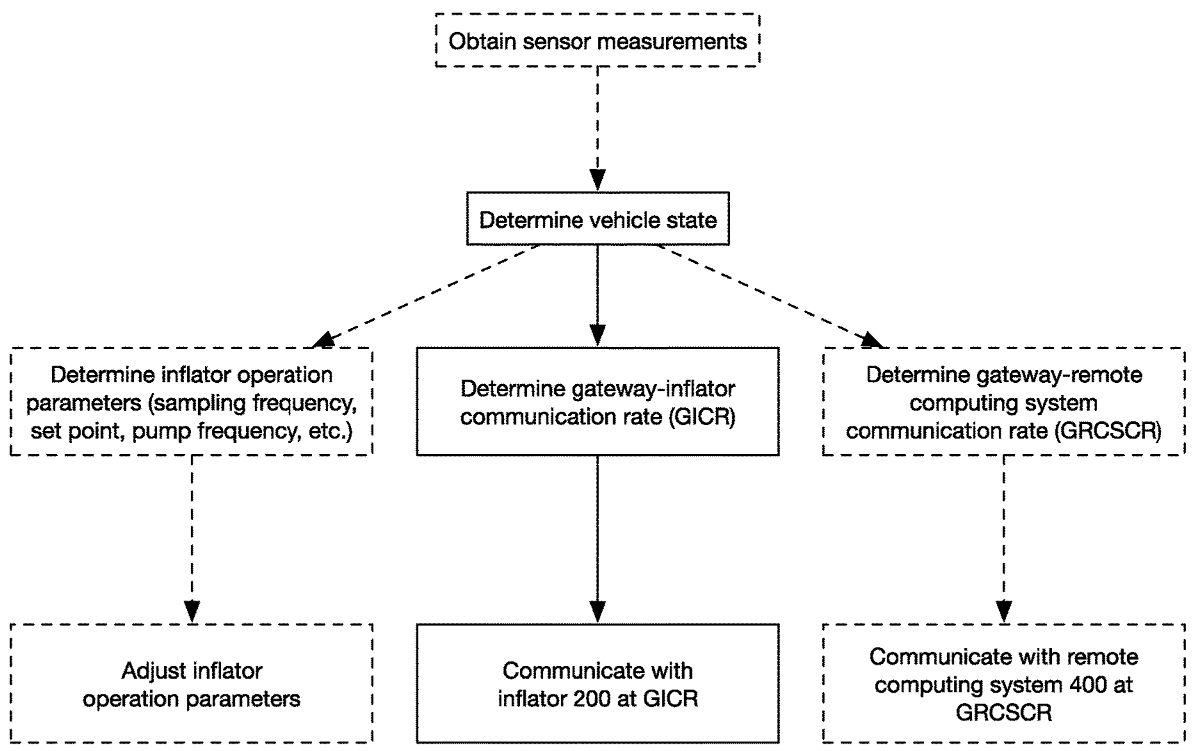
FIG. 7 is a diagram of example processes executed by the gateway processing system.

The inflator communication module 220 can transmit and receive data (e.g., example shown in FIG. 7). The inflator communication module 220 can transmit data according to an inflator communication rate, when a parameter (e.g., inflator parameter) or sensor measurement value exceeds a threshold value, responsive to a request from the gateway 300 and/or user device 500, upon wakeup, and/or at another suitable time. The inflator communication module 220 can transmit any suitable type of information, including but not limited to: tire pressure, pump pressure, pump flow rate, pump actuation rate, power source state of charge, charge rate, wheel rotation rate, pump temperature, calculated pump health values, other tire information, other pump information, other inflator information, and/or any other suitable information. In a specific example, the inflator 200 transmits tire pressure, pump temperature, and/or tire kinematics (e.g., linear speed, rotational speed, etc.) to the gateway 300. The inflator communication module 220 can receive any suitable type of information, including but not limited to: tire setpoints (e.g., tire pressure setpoints), pump setpoints (e.g., pump pressure setpoints, pump actuation rate setpoints, pump flow rate setpoints, etc.), inflator operation state, processes, rules, local models, and/or any other suitable information. In a specific example, the inflator 200 receives a set of a tire pressure setpoints from a remote endpoint (e.g., gateway 300, remote computing system 400, user device 500, etc.). Alternatively, the inflator 200 can communicate directly with the remote computing system 400 and/or user device 500. The inflator communication module 220 can be communicatively connected to inflator communication modules 220 on inflators 200 on the same vehicle and/or a different vehicle (e.g., forming a mesh network).

However, the inflator communication module 220 can be otherwise configured.

Figure 14A:
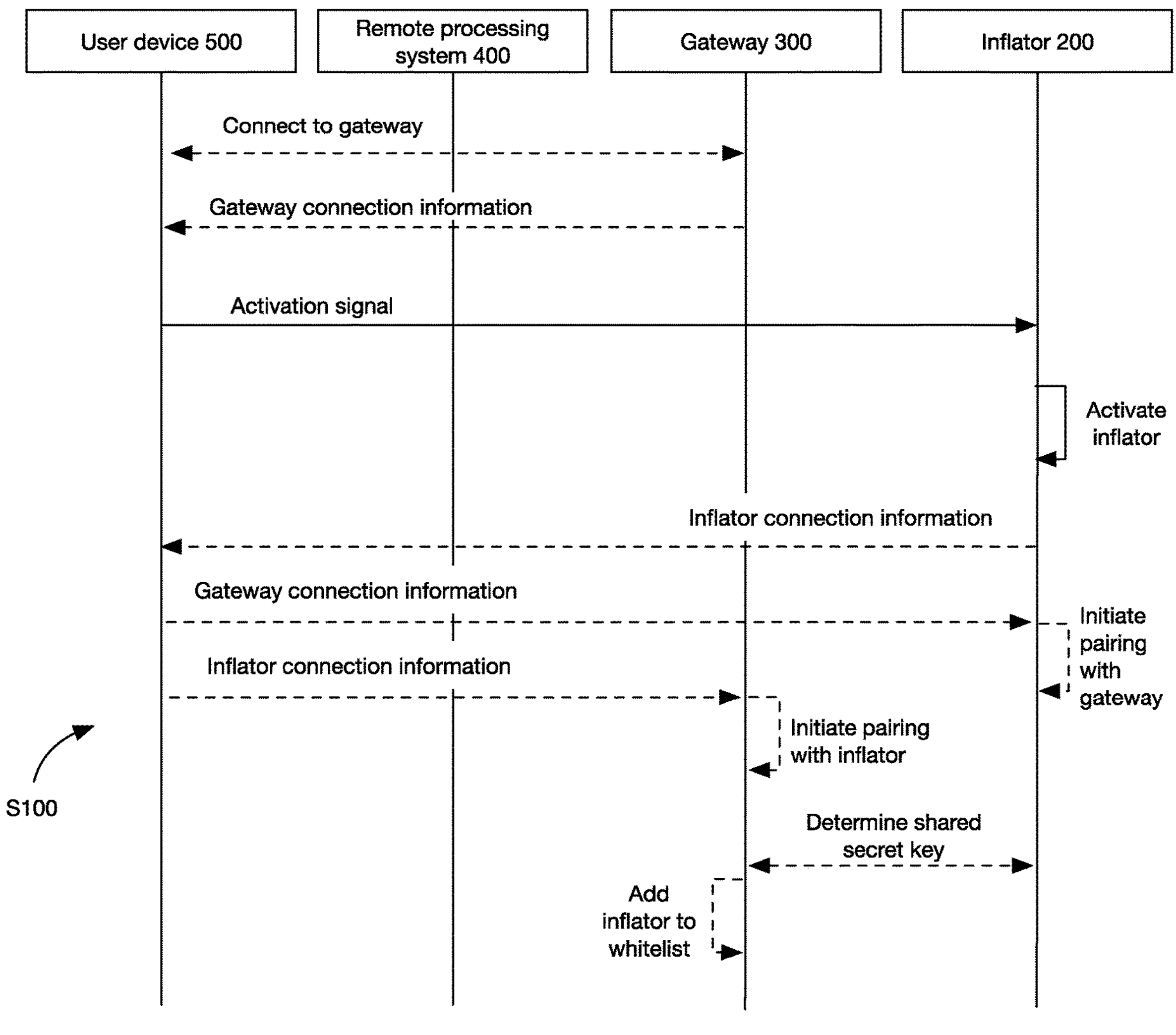
FIGS. 14A and 14B are schematic representations of variants of configuring an inflator.
Figure 14B:
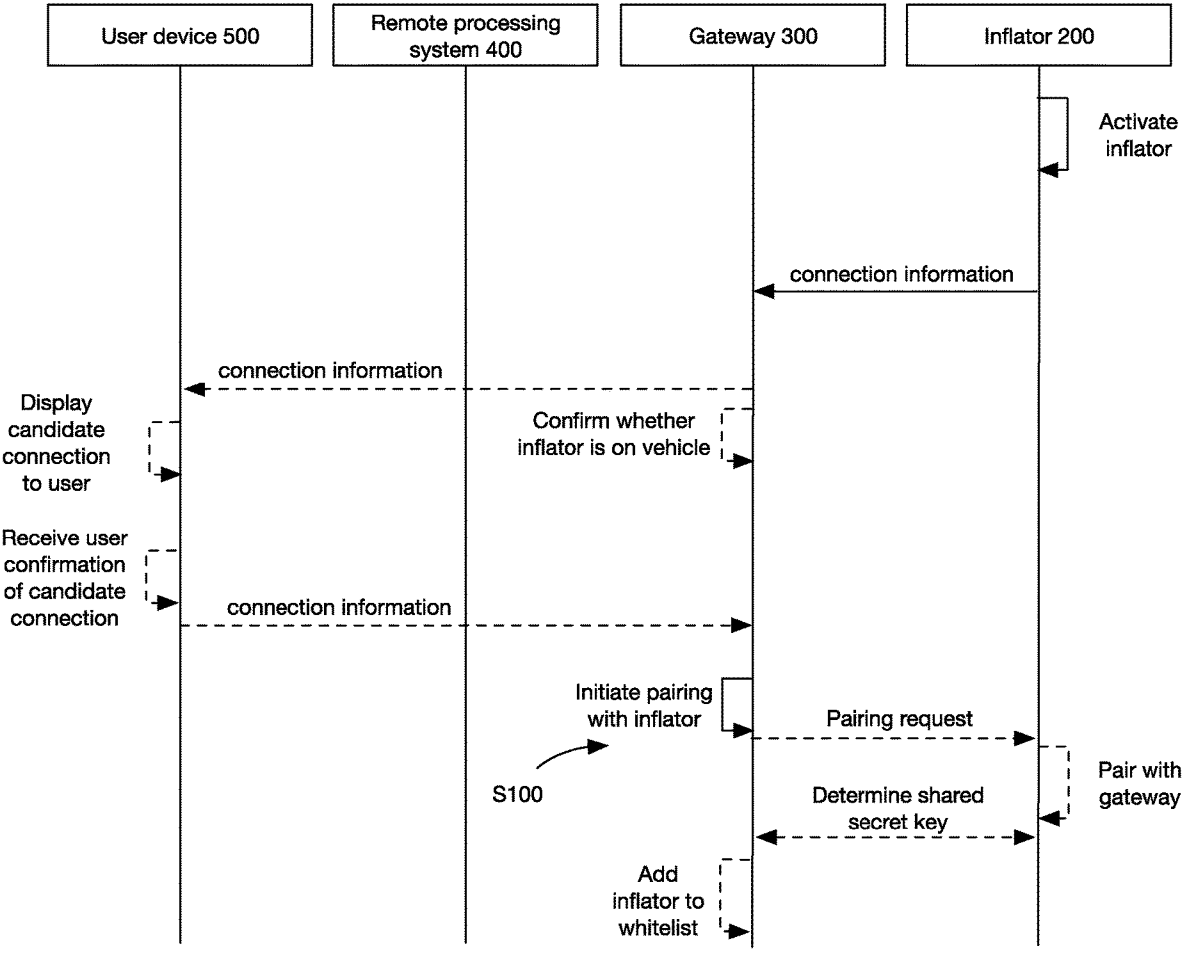

The optional inflator user interface can function to accept user input directly on the inflator 200 without use of the gateway 300. The inflator user interface can preferably be accessible from outside the housing 210 (e.g., inflator user interface is outside of the housing, or the housing has a removable or permanent window) but can alternatively not be directly accessible from outside the housing 210. The inflator 200 preferably has one inflator user interface but can alternatively have more than one inflator user interface or no inflator user interfaces. In a variant, one inflator user interface can be used for multiple communicatively connected inflators 200 (e.g., an inflator user interface at one inflator 200 enables the user to control all inflators 200). The inflator user interface can be used to activate (e.g., "wake up") the inflator (e.g., example shown in FIG. 14B), turn off the inflator, change inflator state, pair the inflator with endpoints, enable other manual interactions with the inflator, and/or perform other tasks.

The inflator user interface can include input and/or output components. Input components can include buttons, touch screens, a short range communication module (e.g., a receiver, transmitter, transceiver, etc.), and/or another suitable input component. The short range communication module can receive and/or transmit NFC, Bluetooth, RF, ZigBee, and/or other types of signals. Output components can include visual output (e.g., LEDs, screens, etc.), audio output (e.g., a buzzer, speaker, etc.), touch output (e.g., a haptic output, etc.), and/or other types of output components. In a variant, the user interface of the inflator 200 can include an NFC receiver which can used to activate (e.g., "wake up") the inflator 200 (e.g., example shown in FIG. 14A), wherein the user device 500 can power an NFC coil onboard the inflator 200, which triggers power provision to other inflator components (e.g., a higher-power inflator communication module 220, the inflator controller 230, etc.).

However, the inflator user interface can be otherwise configured.

The inflator controller 230 (e.g., processing system) can function to control pump actuation. The inflator controller 230 can be a PCB, microcontroller, SBC, System-on-chip module, and/or another suitable controller type. The inflator controller 230 can include memory (e.g., to store operation parameters, setpoints, lookup tables, models, etc.). The inflator controller 230 can store a secret key (e.g., a symmetric key, an asymmetric key, a rotating secret key which has a corresponding secret key in the cloud, etc.) which is used to verify gateways 300, inflators 200, and/or user devices 500 which attempt to connect to the inflator 200 via the inflator communication module 220 and/or inflator user interface. The inflator controller 230 can be located within the housing 210 (e.g., example shown in FIG. 17) but can alternatively be located outside of the housing 210. The inflator 200 preferably includes one inflator controller 230 but can alternatively include multiple inflator controllers 230. Each inflator controller 230 is preferably associated with (e.g., controls) a single inflator 200, but alternatively multiple inflators 200 can share one inflator controller 230.

The inflator controller 230 can control the inflator 200 in one or more ways. In a first variant, the inflator controller 230 can selectively control the inflator 200 to disengage the pump 240 from the drive mechanism 260 (e.g., hanging mass). In a second variant, the inflator controller 230 can selectively put all or portions of the hanging mass into a free spinning state (e.g., by applying a current to the generator). In a third variant, the inflator controller 230 can cut or provide power to an actively powered pump 240. In a fourth variant, the inflator controller 230 can change the pump pressure setpoint (e.g., by changing pump dimensions, etc.). In a fifth variant, the inflator controller 230 can lengthen the pump cycle (e.g., by sending the eccentric mass into a partial free spin, by slowing down the drive mechanism 260, etc.). In a sixth variant, the inflator controller 230 can locally generate pump operation instructions (e.g., control PID loop, generate solenoid valve open/close instructions, etc.). In a seventh variant the inflator controller 230 can turn the pump on or off. However, the inflator controller 230 can alternatively control the pump 240 in other ways.

The inflator controller 230 can additionally perform edge calculations based on information received from the pump 240, sensors, gateway 300, user device 500, information stored on the inflator controller memory or in other locations, and/or based on other data. In a first variant, the inflator controller 230 can determine a tire pressure setpoint based on the information (e.g., based on vehicle parameters and/or driving context received from a remote endpoint). In a second variant, the inflator controller 230 can determine a pump operation setpoint based on the information (e.g., based on onboard sensor measurements). In a third variant, the inflator controller 230 can determine a vehicle operation state based on the information. In a fourth variant, the inflator controller 230 can aggregate data, subsample data, generate summary data (e.g., averages, sums, etc.), and/or otherwise process data generated onboard the inflator 200. However, the inflator controller 230 can determine any suitable parameter relating to the inflator 200, vehicle, environment, and/or other system component.

However, the inflator controller 230 can be otherwise configured.

The optional water management system of the inflator 200 can function to control the moisture content of air within the tire 10. Examples of water management systems include a heating and/or cooling system, a dehumidifier, a desiccant, and/or other water management systems. The water management system can be located in the pump 240, tire 10, pump intake channel 250, pump exhaust channel 255, housing 210, and/or another suitable location. However, the water management system can be otherwise configured.

The inflator 200 can include valves, which function to control airflow through a pump intake channel 250, the pump 240 itself, a pump exhaust channel 255 (e.g., example shown in FIG. 8A), and/or any other suitable component. In a first variant, the valves can be passive pressure valves preventing backflow. In a second variant, the valves can be actively actuated by the inflator controller 230. However, the valves can be otherwise configured.

The inflator 200 can include a set of sensors (e.g., example shown in FIG. 17), which function to monitor the inflator 200, wheel, and other wheel-end components. Examples of sensors that can be used include: pressure sensors, humidity sensors, temperature sensors, a kinematic sensor (IMU, gyroscope, accelerometer, etc.), and/or other sensors. Inflator sensors can monitor the environment, the pump 240, pump intake channel 250, pump exhaust channel 255, the tire 10, the wheel hub, and/or other sensing targets. The sensors can be located within: the pump intake channel 250, the pump exhaust channel 255, the pump 240, the tire 10, the housing 210 interior, the housing 210 exterior, and/or any other suitable location. In specific examples, the sensors can include: a TPMS sensor in the tire 10, a pressure sensor in the hose connecting inflator 200 and tire 10 (e.g., the pump exhaust channel 255), a pressure sensor in the pump 240 or another suitable location, an air pressure sensor, a pump temperature sensor, a tire humidity sensor, tread depth sensor, an environmental humidity sensor, a temperature sensor, and/or other suitable types of sensors. In a first example, sensors are not inside the tire 10. In a second example, all sensors at the wheel end are contained within the inflator housing 210. However, the inflator sensors can be otherwise located. The inflator 200 can include any number of sensors of any type, but the inflator 200 preferably includes at least one pressure sensor. Sensors are preferably wired to the inflator controller 230, but can alternatively be wirelessly connected (e.g., where each sensor has its own communication module). The sensors can be communicatively coupled (e.g., directly or indirectly) to the inflator communication module 220 via wired or wireless connections (e.g., Bluetooth, BLE, NFC, and/or other low-power or high-power wireless connections). Sensors can be optionally connected to a signal relay component which connects to the inflator controller 230 or gateway 300. In a specific example, a tread depth sensor physically connected to the tire 10 wirelessly relays tread depth to an inflator 200 (e.g., a signal relay component) mounted remotely to the sensor. Sensors can optionally form a mesh with each other and/or with inflators 200. Sensors can be powered by the inflator power source 280 or by an on-sensor battery or generator. However, the inflator sensors can be otherwise configured. Additionally or alternatively, the system can use data from sensors mounted to the tire 10, the vehicle (e.g., the battery, the alternator, etc.), and/or any other suitable vehicle component.

Each sensor can sample data based on a sensor sampling frequency, when a sampling condition is met (e.g., upon occurrence of a predetermined event), upon request (e.g., by the gateway 300, remote computing system 400, etc.), continuously, and/or at any other suitable time. The sensor sampling frequency (e.g., measurement frequency) can depend on detected events (e.g., from other sensors, calculated at the gateway 300, etc.), vehicle operation state, inflator operation state, vehicle speed, rotation speed, and/or other suitable information. In a first variant, the sensor sampling frequency can depend on vehicle operation state (e.g., decreasing the sampling frequency as a function of vehicle speed, ceasing sampling when the vehicle is parked, etc.). In a second variant, the sensor sampling frequency can depend on the sensor power source (e.g., decreasing the frequency when the sensor battery is running low or when the sensor is operating off of battery power instead of a generator). The sensor sampling frequency can be the same or different for sensor on a wheel and/or sensors on different wheels. The sensor data transmission rate can be the same as the sensor sampling frequency or the sensor data transmission rate can be a different value. However, the sensor sampling frequency can be otherwise determined and/or modified.

However, the sensors can be otherwise configured.

Gateway.

The gateway 300 of the system functions to relay information between local systems (e.g., the inflators 200, etc.) and remote systems (e.g., remote computing systems 400, user devices 500, etc.). In variants, the gateway 300 can additionally or alternatively function to monitor the inflators 200, the vehicle and the environment using data received from the inflator 200, remote computing system 400, sensors, CAN bus, and/or other data sources. The gateway 300 can use rulesets, models, lookup tables, optimization functions, and/or other analysis modules. Analysis modules can be manually specified, can be a default module, can be learned (e.g., from historical data for each inflator 200, inflator set, vehicle, vehicle set, fleet, etc.), and/or can be otherwise determined. The analysis modules can be specific to the vehicle, the inflator 200, the set of tires 10, the fleet, the driver, be shared, and/or be otherwise specific or generic. In a first variant, the gateway 300 can detect adverse events based on sensor data from connected inflators 200 and determine an alert response (e.g., sending an alert to the user via a gateway user output or the user device 500, sending an instruction to the inflator 200, etc.). In a second variant, the gateway 300 can characterize the environment based on sensor data and transmit the characterization and/or sensor data to the remote computing system 400. In a third variant, the gateway 300 can determine an inflator operation parameter or receive an inflator operation parameter from the remote computing system 400 and transmit the operation parameter to the inflator 200. In a fourth variant, the gateway 300 can determine the driving context (e.g., vehicle location, vehicle speed, etc.) and optionally send the driving context to the remote computing system 400 (and/or any other suitable system that determines the inflator setpoints). However, the gateway 300 can perform other suitable functions.

The gateway 300 can be located on the vehicle and preferably not mounted to the wheel. However, the gateway 300 can be an inflator 200 in the set of inflators 200, be mounted to the wheel, or be otherwise arranged. In a first variant, the gateway 300 can be mounted to the vehicle cab, a cargo bed, a trailer, the bottom of the vehicle, the top of the vehicle, a wheel, can be not mounted to the vehicle, and/or can be mounted to any other suitable location. In an example, the gateway 300 can have an onboard battery and can be moved around the vehicle. In a second variant, the gateway 300 can be integrated into an inflator 200 and/or be mounted next to an inflator 200. In a third variant, the gateway 300 can be a user device 500. However, the gateway can be otherwise located.

The system and/or vehicle can include one or more gateways 300 or no gateways 300. In a first variant, a connected tractor and trailer each have a set of gateways 300 (preferably one gateway 300 per vehicle, e.g., example shown in FIG. 15). The gateways 300 can be communicatively coupled to each other via CAN bus, another suitable wired connection, a wireless connection (e.g., Bluetooth, etc.), an intermediate component (e.g., the remote computing system 400, an inflator 200, a user device 500, etc.). In a second variant, the tractor-trailer system can have one gateway 300 serving inflators 200 on one or both vehicles.

Figure 15:
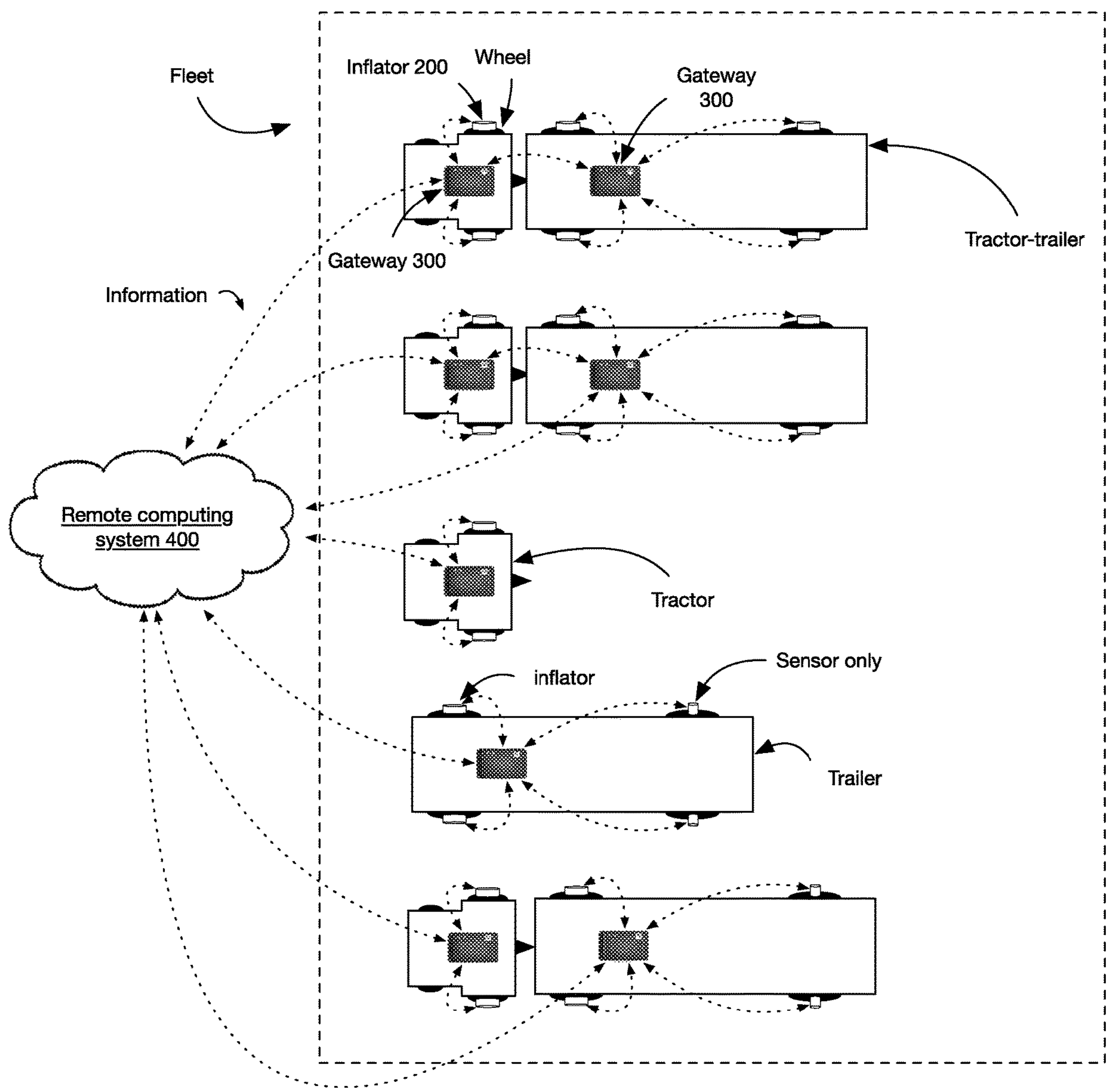
FIG. 15 is an illustrative example of a variant of a fleet.

When a vehicle includes multiple gateways 300 (e.g., on a tractor-trailer), the gateways 300 can communicate with each other (e.g., example shown in FIG. 15). In a first variant, gateways 300 can have permissions to access all data on other gateways 300 (e.g., whitelisted gateways 300, gateways 300 on the same local area network, etc.). In a second variant, gateways 300 can have permissions to access a subset of data. However, vehicles with multiple gateways 300 can share information any other suitable manner.

The gateway 300 can function as a data intermediary between the inflator 200 and remote endpoints (e.g., a remote computing system 400, a user device 500, etc.) but can also generate and/or gather data, generate analyses, detect events, determine tire pressure setpoints, determine pump setpoints, determine an inflator operation state, a vehicle motion or operation state, and/or can perform other functions. The gateway 300 can compress data, decompress data, encrypt data, decrypt data, and/or authenticate data (e.g., before forwarding to the next setpoint). The gateway can include a set of remote computing system credentials for communicating with the remote computing system. The gateway can include a set of inflator credentials for communicating with an inflator or a set of inflators. The remote computing system credentials and the inflator credentials can be the same credentials or different credentials (e.g., wherein the gateway includes two or more sets of communication credentials to connect to different endpoints). However, the gateway can include any other suitable information.

Examples of information transmitted by the gateway 300 to the remote computing system 400 can include vehicle parameters, driving context data, relayed inflator parameters, and/or other suitable information. Examples of information transmitted by the gateway 300 to the inflator 200 can include setpoints, controls, over-the-air updates, and/or other suitable information.

Information sent by and/or received by the gateway 300 can be encrypted or unencrypted. Information can be encrypted by the sensor, inflator 200, gateway 300, and/or cloud. The encryption protocol can be AES-256, AES-128, Serpent, TLS 1.2, TLS 1.3, Wireguard, ECC, RSA, and/or another suitable encryption protocol. The gateway 300 can optionally decrypt information or relay encrypted information. The gateway 300 can verify received inflator instructions before relaying the instructions to the inflator 200 by using security keys (e.g., symmetric or asymmetric) to verify the sender, by only accepting instructions received from a trusted source (e.g., on a whitelist), and/or otherwise authenticating received data. However, information can be otherwise encrypted, verified, authenticated, authorized, and/or secured.

The gateway 300 can send information to the remote computing system 400 and/or inflator 200 on a schedule (e.g., based on a set of inflator communication rates), responsive to an event, responsive to a user command, responsive to another prompt, selectively based on the vehicle's operation state (e.g., whether the vehicle is driving or not, based on the vehicle's state of charge, etc.), and/or at any other suitable time. The information can be information generated at the gateway 300 or can be information received from the inflator 200, sensors, the vehicle CAN bus, and/or another source. The gateway communication rates (e.g., how often the gateway 300 communicates with the remote computing system 400 and/or inflator 200) can depend on vehicle motion and/or operation state, inflator operation state, and/or any other suitable piece of information. The gateway communication rates can include a gateway-remote computing systems communication rate (e.g., GRCSCR) which determines how often the gateway 300 communicates with the cloud (e.g., example shown in FIG. 7). The gateway communication rates can include a gateway-inflator communication rate (e.g., GICR) which determines how often the gateway 300 communicates with the inflator 200. However, the gateway communication rates can include any other suitable set of communication rates.

The gateway 300 can store information. In a first variant, the gateway 300 can store information for a limited time (e.g., 15 days). In a second variant, the gateway 300 can store information until an event occurs (e.g., the gateway 300 sends the information to the cloud and/or the cloud sends a receipt confirmation to the gateway 300). In a third variant, the gateway 300 can store information persistently. In a fourth variant, the gateway 300 can store information until a condition is met (e.g., the user requests data removal, the vehicle turned off, new information is received from the remote computing system 400, etc.). However, information can be stored for another suitable length of time.

Figure 9:
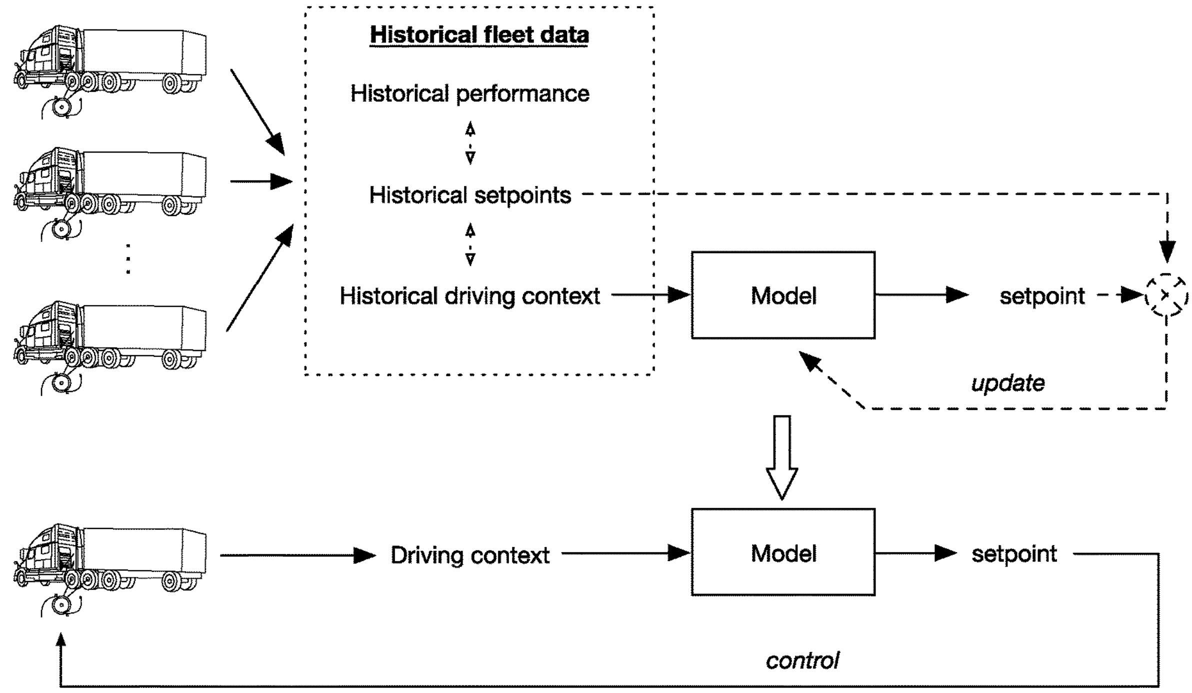
FIG. 9 is a schematic representation of an example of setpoint determination model training and usage.

The gateway 300 can execute local decision making. In variants, local decision making can be determining a vehicle, inflator 200, and/or gateway operation state; determining vehicle servicing needs, encrypting and/or decrypting data, processing information, determining a tire pressure setpoint, determining a pump pressure setpoint, and/or other suitable forms of local decision making. In a variant, the gateway 300 can determine operation parameters using a setpoint determination model (e.g., example shown in FIG. 9). In a specific example, in the event of GPS failure, the gateway 300 can use motion data to estimate location (e.g., using dead reckoning).

The gateway 300 can pair with inflators 200 on or off the vehicle. The gateway 300 can preferably pair with all inflators 200 mounted to the vehicle but can alternatively pair with a subset of inflators 200 mounted to the vehicle. The gateway 300 and inflators 200 can pair using Bluetooth, BLE, UWB, RF, Zigbee, Wi-Fi, and/or another suitable communication method. The gateway 300 can be a central communication hub for an inflator-gateway network (e.g., a set of connected inflators 200 and gateways 300) but can alternatively be peripheral to an inflator-gateway network. Inflators 200 are preferably peripheral within the inflator-gateway network but can alternatively be central. In a specific example, inflators 200 can enter into a pairing mode (e.g., automatic or user-prompted), advertise their identity, receive a connection request from a gateway 300, and pair with the gateway 300. In another specific example, inflators 200 can broadcast their data, wherein any gateway 300 within range can receive the broadcast data packets. In this example, the data can be encrypted, wherein only gateways 300, remote computing systems 400 (e.g., receiving the forwarded data), and/or other endpoints with the corresponding decryption keys can read the data, or the data can be unencrypted (e.g., plaintext). However, further variants of inflator-gateway 300 pairing are described as part of configuring the inflator S200.

The gateway 300 can determine inflator parameters based on inflator signal modulation. For example, the gateway 300 can estimate inflator rotation speed, inflator position, inflator orientation, and/or other information about inflator 200 and vehicle behavior based on the determined inflator signal modulation. In a specific example, a gateway 300 attached to a tractor can use signal modulation data from inflators 200 on a trailer to verify that the trailer is attached. In a second specific example, a gateway 300 attached to a trailer can use signal modulation data from inflators 200 attached to a tractor to verify that the trailer is attached. In a third specific example, the gateway 300 can calculate the tire 10 speed based on the inflator signal modulation rate. However, inflator parameters can be otherwise determined based on inflator signal modulation and/or strength.

Figure 18:
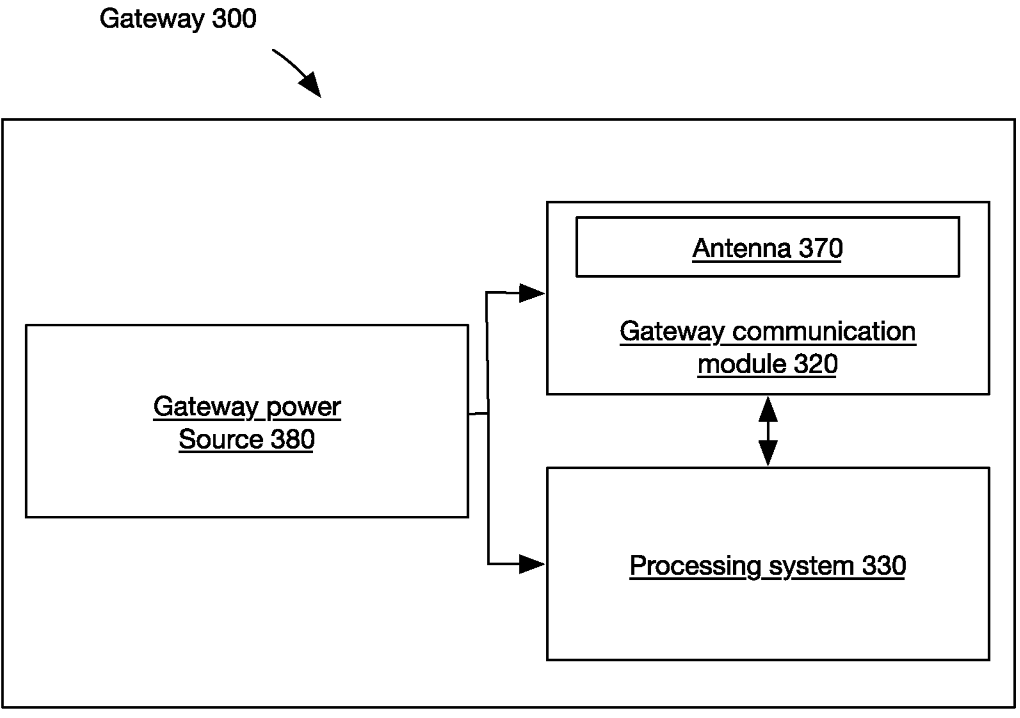
FIG. 18 is a schematic representation of a variant of the gateway.

The gateway 300 can include a set of gateway communication modules 320, processing system 330, memory, sensors, a gateway power source 380, a display, an input mechanism, and/or any other suitable component (e.g., example shown in FIG. 18). The gateway 300 can be standalone unit, a third party gateway, an inflator 200, an application executing on a user device 500, a cloud processing system, and/or another suitable gateway 300.

The gateway communication module 320 of the gateway 300 can function to facilitate information transfer between the inflator 200 and the gateway 300. The gateway 300 can preferably include two gateway communication modules 320 (e.g., one module for high-power communications and a second module for low-power communication). However, the gateway 300 can include a single gateway communication module 320 or any number of communication modules 320. Each gateway communication module 320 can operate between multiple power states (e.g., high-power, low-power, sleeping, etc.).

Figure 4:
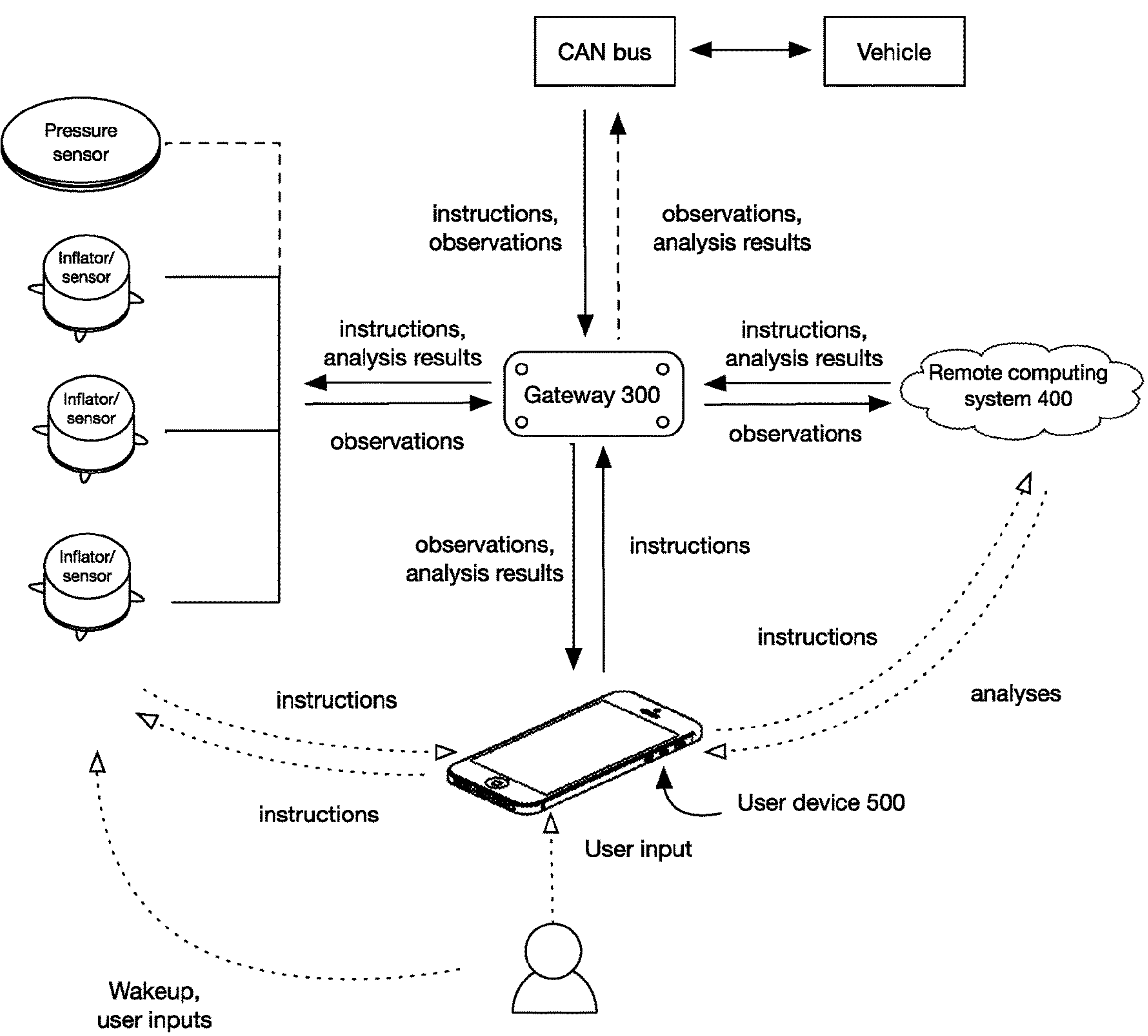
FIG. 4 is a schematic representation of a specific example of data pathways throughout the system.

Each gateway communication module 320 can use one communication protocol or multiple communication protocols. Examples of communication protocols include: a CAN bus protocol, J1939 CAN protocol, SAE J1850 PWN, SAE J1850 VPW, ISO 14230 KWP2000, EOBD, HD-OBD, Bluetooth, BLE, Wi-Fi, LTE, low-power protocols, high-power protocols, and/or other suitable types of communication protocols. A gateway communication module 320 can include wired and/or wireless connections to sensors, the vehicle, inflators 200, the user device 500, and/or the remote computing system 400 (e.g., example shown in FIG. 4). Examples of wired connections include a OBDII port or other OBD-standard ports, a USB standard port, an Ethernet port, a CAN bus, and/or other suitable types of wired connections. Preferably, the gateway 300 communicatively connects to the remote computing system 400 via a high-power wireless connection (e.g., LTE); however, the gateway 300 can communicatively connect to the remote computing system 400 using any other suitable type of connection. Preferably, the gateway 300 communicatively connects to the inflator 200 via a low-power wireless connection (e.g., Bluetooth); however, the gateway 300 can communicatively connect to the inflator 200 using any other suitable type of connection.

A gateway communication module 320 can transmit and/or receive data at any gateway communication rate (e.g., in real-time, every ten seconds, every minute, every ten minutes, every hour, etc.) Preferably, the gateway communication rate is variable depending on the vehicle operation state, gateway operation state, gateway power source current and/or voltage, and/or any other suitable parameter. In a specific example, the gateway communication rate is high when the gateway 300 is in a high-power operation state and low when the gateway 300 is in a low-power operation state. In a second specific example, the gateway-inflator communication rate is high when the inflator 200 is in a high-power operation state and low when the inflator 200 is in a low-power operation state. The gateway communication rate can be determined at the gateway 300 or can be wirelessly received by a gateway communication module 320 (e.g., from the remote computing system 400, user device 500, etc.). Alternatively, the gateway communication rate can be constant. However, the gateway communication rate can be otherwise determined and/or used.

Figure 16A:
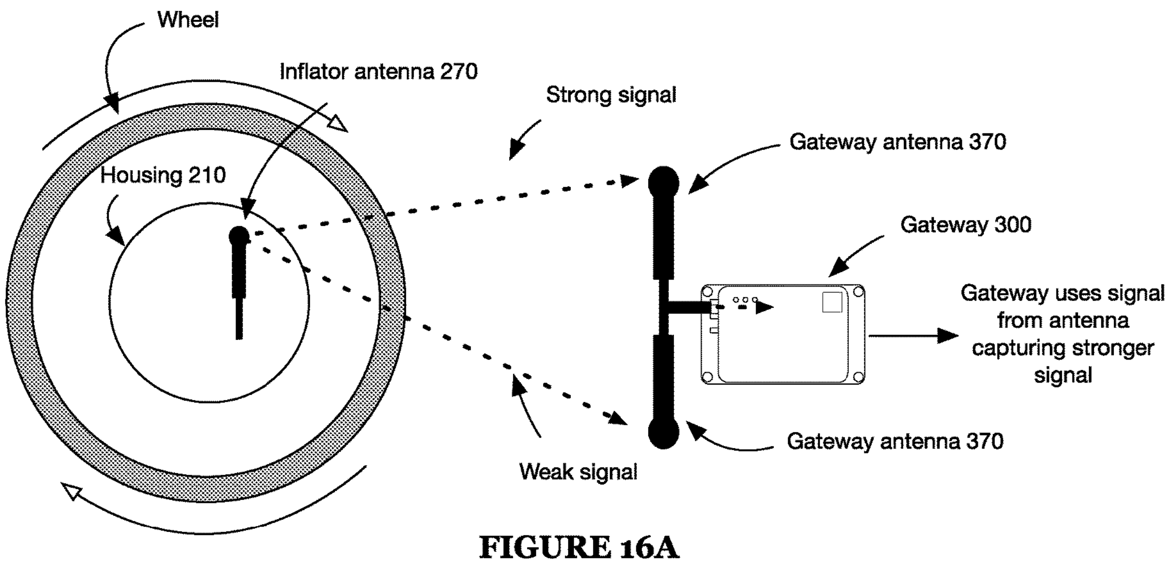
FIGS. 16A and 16B are illustrative examples of a variant of antenna performance.
Figure 16B:
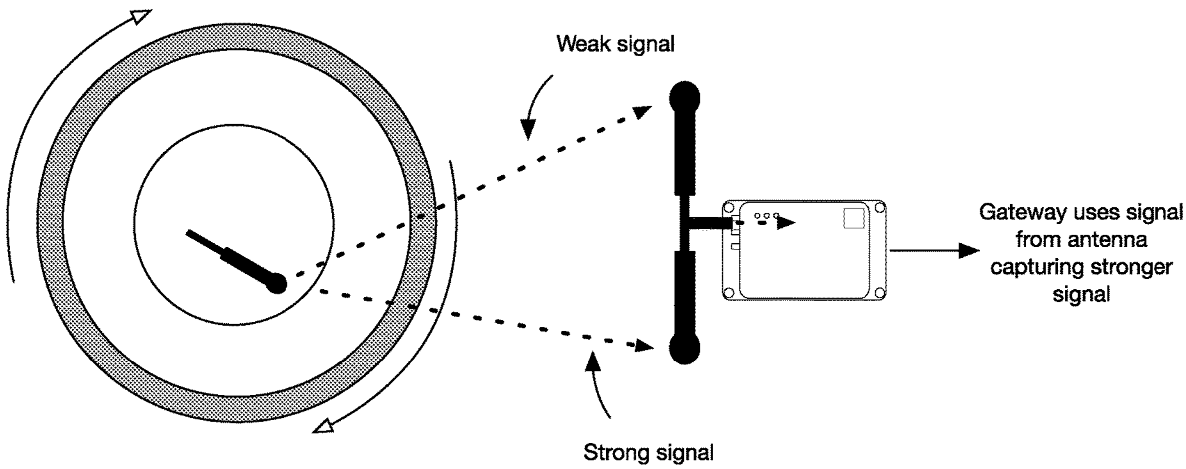

A gateway communication module 320 can include a set of antennas 370. The antennas 370 can be arranged orthogonally, opposing each other, in parallel, colinear, and/or at another suitable relative angle to each other. The gateway communication module 320 can select which antenna 370 to use based on the strength and/or modulation of the signal received at each antenna 370, examples shown in FIG. 16A and FIG. 16B (e.g., selecting the antenna 370 receiving the strongest signal, selecting the antenna 370 receiving a signal above a threshold strength, etc.). Alternatively, the gateway communication module 320 can select which antenna 370 to use based on a wheel rotation range (e.g., when a wheel is within a certain angular range). In a specific example, a gateway communication module 320 has two antennas 370 pointing opposite each other (e.g., aligned on a common axis) and switches between the stronger signal antenna 370. However, the gateway communication module 320 can use any suitable antenna configuration.

The gateway 300 can optionally include or receive data from one or more sensors. Sensors on and/or communicatively coupled to the gateway 300 can include environmental sensors, location sensors (e.g., GPS), cameras (e.g., RGB, IR, UV, etc.), kinematic sensors (e.g., IMU, accelerometer, vibrometer, etc.), and/or or other suitable sensor types. Examples of environmental sensors include a camera mounted to the dashboard, a temperature sensor integrated into the vehicle, an external humidity sensor, light sensors, and/or any other suitable type of environmental sensor. However, sensors can include other suitable sensor types.

Sensors can be mounted to the gateway 300; integrated into the vehicle and communicatively connected to the gateway 300 (e.g., via a CAN bus); peripheral to the gateway 300 on the inside or outside of the vehicle cab, trailer bed; attached to an air spring or other suitable vehicle component, and/or otherwise located.

The sensors can be powered by the same power source as the gateway 300 or a different power source. Sensors can be powered by an on-sensor battery, gateway power source 380, inflator power source 280, generator (e.g., a solar panel), vehicle power source, can be passively operated, and/or can use any other suitable power source.

The gateway 300 can have or be connected to a gateway power source 380. The gateway power source 380 can be a vehicle power source, vehicle battery, off-vehicle battery, and/or another suitable power source. The gateway 300 can be wired to the vehicle and/or another entity. The gateway power source 380 can include one power source or multiple power sources (e.g., where the gateway switches between power sources). In variants where the gateway power source 380 is a battery, the battery can be chargeable or non-rechargeable. In variants where the gateway power source 380 is a battery, the battery can charge from the vehicle battery, vehicle alternator, solar panels, and/or another suitable power source. Batteries can be shared between gateways 300; alternatively each gateway 300 can have its own power source. The gateway power source 380 can enable the gateway 300 to transmit and/or receive signals for 1 day, 10 days, 30 days, 60 days, 120 days, 1 year, and/or any other suitable duration within an open or closed range bounded by any of the aforementioned values. However, the gateway power source 380 can be otherwise configured.

However, the gateway 300 can be otherwise configured.

Remote Computing System.

The remote computing system 400 can function to perform computation-heavy and/or high power tasks (e.g., fleet-level analysis, error detection, etc.), store fleet-level information, enable fleet management, and/or perform other tasks. A user can store operation parameters at the remote computing system 400, wherein the remote computing system 400 can propagate the operation parameters to the inflators 200 within the fleet. Operation parameters are preferably determined without using tire measurements. Alternatively, operation parameters can be determined using tire measurements and/or any other suitable type of information, such as including fleet information. Determined operation parameters can be transmitted to gateways 300 and/or inflators 200 and/or can be otherwise used.

The remote computing system 400 can receive information from at least one endpoint (e.g., gateway 300, inflator 200, etc.) and can determine fleet-level, vehicle-level, and/or inflator-level operation parameters (e.g., setpoints) based on the received information. Additionally or alternatively, the remote computing system 400 can determine operation parameters independent of any information received from the inflator 200 and/or gateway 300.

In a variant, the remote computing system 400 can determine operation parameters. The operation parameters are preferably determined based on driving context data but can additionally or alternatively be determined based on vehicle parameters, tire parameters, fleet information, inflator measurements, tire measurements, observations, and/or any other suitable data. In a specific example, the operation parameters are determined without (e.g., independent of) inflator measurements and/or tire measurements (e.g., independent of tire pressure, tire temperature, etc.). The operation parameters can be: looked up (e.g., from a manufacturer-provided or user-provided lookup table), estimated, optimized, predicted, inferred, manually specified, and/or otherwise determined.

The operation parameters are preferably determined using a setpoint determination model but can be otherwise determined. The setpoint determination model can be learned from historical data (e.g., example shown in FIG. 9), received from the user, and/or otherwise determined. The historical data is preferably for a specific fleet but can additionally or alternatively be for a specific tire type (e.g., make and/or model); specific tire age range; specific tire position; shared across fleets, tire types, age ranges, tire positions; and/or otherwise specific or generic, wherein the resultant setpoint determination model can also be specific or generic, based on the learning data. In a specific example, the setpoint determination model can be learned by training the setpoint determination model to predict a historic setpoint (e.g., associated with good historic vehicle performance) given a set of historic driving context associated with the historic setpoint. The setpoint determination model can be a neural network (e.g., CNN, DNN, RNN, transformer model, etc.) or another machine learning model. The model can include (e.g., be constructed using) a set of input layers, output layers, and hidden layers (e.g., connected in series, connected with a feedback loop between the output and the input; etc.); a set of connected convolution layers (e.g., in a CNN); a set of self-attention layers; and/or have any other suitable architecture. The model can extract data features (e.g., feature values, feature vectors, etc.) from the input data, and determine the output based on the extracted features. The model can be trained using supervised, unsupervised, semi-supervised, self-supervised, and/or other training methods. However, the setpoint determination model can be determined using regression, optimization, and/or otherwise determined.

The remote computing system 400 can aggregate data from multiple tires 10, vehicles, gateways 300, and/or fleets. The remote computing system 400 can send information to and receive information from external endpoints (e.g., user device 500, client, inflator 200, etc.). The remote computing system 400 can connect to the vehicle via the gateway 300, user device 500, inflator 200 and/or another suitable component. In a preferred variant, the remote computing system 400 connects to the inflator 200 and sensors on a vehicle via the gateway 300 mounted to the vehicle.

The remote computing system 400 can be a cloud computing system but can additionally or alternatively run on a local server. The remote computing system 400 can be persistently available but can alternatively be intermittently available (e.g., according to a remote computing system 400 availability schedule). The system can include one remote computing system 400 but can alternatively include more than one remote computing system 400. In variants where the system includes more than one remote computing system 400, remote computing systems 400 can communicate with overlapping or non-overlapping gateways 300. However, the remote computing system 400 can be alternatively connected.

The remote computing system 400 can use security protocols to verify endpoint identities and protect transmitted information. In a first variant, the remote computing system 400 can store a set of encryption keys for different endpoints, different overlapping or non-overlapping sets of endpoints, and/or all endpoints. In this variant, the remote computing system 400 can encrypt and/or decrypt information received from an endpoint (e.g., a gateway 300, user device 500, and/or inflator 200) or sent to an endpoint from the remote computing system 400. The keys stored on the remote computing system 400 can be the same keys stored on the endpoint; however, the keys can alternatively be different or complementary. The keys stored on the remote computing system 400 can rotate in sync with the keys on the endpoint or can not rotate. In a second variant, the remote computing system 400 can store a set of credentials to verify the endpoint's identity. In a third variant, the remote computing system 400 can send a set of credentials to prove the remote computing system's 400 own identity to an endpoint. The user device 500 can store credentials and other security information representing a user, a set of gateways 300, and/or a set of inflators 200. The user device 500 can verify the user's identity to a gateway 300, remote computing system 400, and/or inflator 200 to prevent tampering of the tires 10. In an example, inflators 200 will only accept operation parameters (e.g., tire pressure setpoints) sent by a specific user device 500. However, the remote computing system 400 can use additional or alternative security measures.

However, the remote computing system 400 can be otherwise configured.

User Device.

The system can optionally be used with a user device 500, which can function to receive and/or send information to and from endpoints (e.g., the gateway 300, inflator 200, remote computing system 400, etc.), can receive user inputs, can synthesize received information, can display synthesized information on a user interface of the user device 500, can present notifications and instructions, and/or perform other functionalities. The user device 500 can be the gateway 300, a vehicle UI (e.g., an infotainment system), a dashboard screen, a personal computer (e.g., laptop, tablet, smartphone, etc.), smartphone, tablet, a set of lights on the vehicle, and/or another suitable user device 500. A user device 500 can include a user interface. The user interface can be a screen, a light, a microphone and speaker, and/or any other suitable user interface. In an example, the user interface is a screen on a smartphone or tablet (e.g., the user device 500). The user interface can display information (e.g., alerts, notifications, sensor readings, etc.). Alerts can include a leak detection alert, loose wheel alert, loose bolt alert, impending blowout alert, a faulty inflator alert, and/or any other suitable type of alert. Information can be generated locally, at the gateway 300, by the remote computing system 400, inflator 200, sensors, and/or another suitable endpoint.

The user device 500 can display information to the user and/or can enable the user to interact with the system via the user interface. In a first variant, the user device 500 receives logs and/or operational data, processes the information, and displays an interactive interface to the user. In an example, the user can view tire pressure via the user device 500 and change the tire pressure setpoint by interacting with the user device 500. In a second variant, the user device 500 receives alerts from an endpoint (e.g., gateway 300, remote computing system 400, inflator 200, sensor, etc.) and alerts the user through visual means, aural means, a vibration, UI logic, and/or another mechanism.

The user device 500 can enable pairing of endpoints. In a first variant, the user device 500 can send an activation signal (e.g., an NFC signal) to activate (e.g., "wake up") an inflator 200, which uses the information in the signal to connect to the gateway 300 over a higher-bandwidth protocol (e.g., example shown in FIG. 14A). In a second variant, the user device 500 can receive information about an entity (e.g., an inflator 200) from an endpoint and verify the endpoint's identity. In an example of this variant, the user device 500 can prompt a user to approve a connection between a gateway 300 and a newly-recognized inflator 200 or second gateway 300. In a third variant, the user device 500 can establish connections to two endpoints, receive connection information for at least one of the endpoints (via the user device connection), and forward the connection information to the other endpoint (via the user device connection), wherein the other endpoint can use the connection information to establish a connection with the first endpoint. However, the user device 500 can otherwise enable the pairing of endpoints.

However, the user device 500 can be otherwise configured.

4. Method

Figure 10:
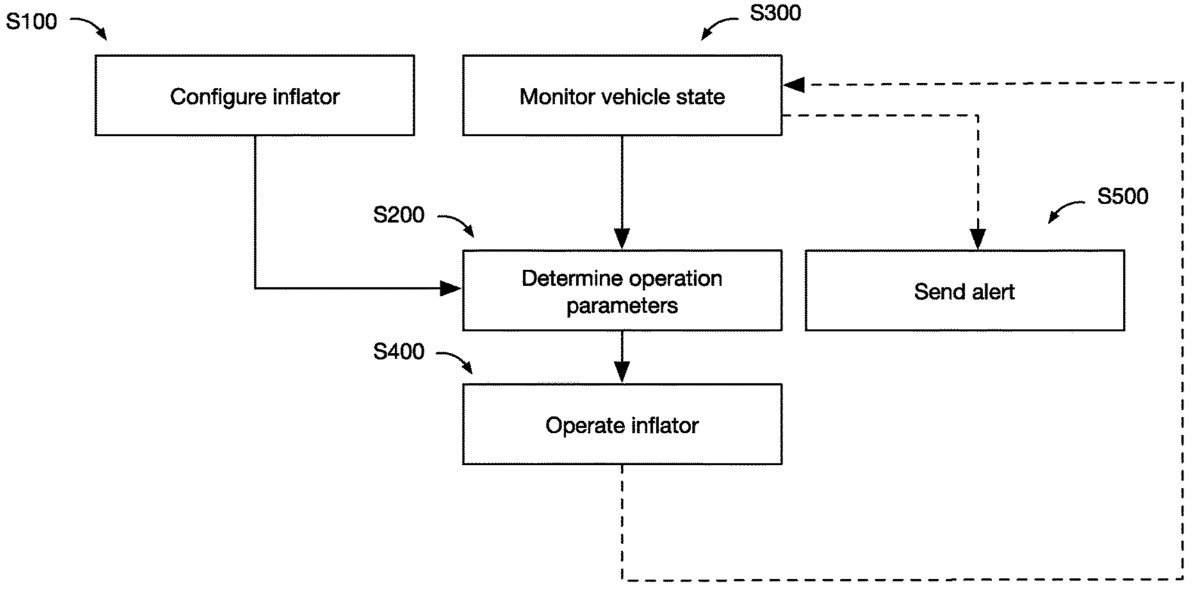
FIG. 10 is a schematic representation of a variant of the method.

As shown in FIG. 10, the method can include configuring the inflator S100, determining operation parameters S200, monitoring vehicle state S300, operating the inflator S400, and sending an alert S500. The method functions to monitor and operate a tire pressure management system mounted to a vehicle.

All or portions of the method can be performed in real time (e.g., responsive to a request), iteratively, concurrently, asynchronously, periodically, and/or at any other suitable time. All or portions of the method can be performed automatically, manually, semi-automatically, and/or otherwise performed.

The method is preferably performed using the system discussed above but can additionally or alternatively be performed using any other suitable system.

Configuring the Inflator S100

Configuring the inflator S100 functions to connect an inflator 200 to the system. Connecting an inflator 200 to the system can preferably be connecting the inflator 200 to a gateway 300 but can alternatively be connecting the inflator 200 to another inflator 200, to a remote computing system 400, to a user device 500, or to another suitable entity. All inflators 200 in the fleet and/or vehicle can be configured as a batch (e.g., when installed on a vehicle and/or when not installed on a vehicle); alternatively, inflators 200 can be configured individually.

Configuring the inflator S100 can preferably be performed when the inflator 200 is mounted to the wheel while the vehicle is parked, but the inflator 200 can alternatively be configured while the vehicle is moved, when the vehicle is in a long parked state, when a user input is received (e.g., a button press, an NFC signal, etc.), when a pairing request is received, and/or at another suitable time.

The inflator 200 can be activated (e.g., "woken up"; switched from an inactive operation state to an active operation state). Methods for waking up the inflator 200 include: manually turning the inflator 200 on (e.g., with a button), connecting the inflator 200 with a power source 280 (e.g., a temporary battery), switching the inflator's power source (e.g., from a battery to a generator), sending an NFC signal to a receiver on the inflator 200, rotating the inflator 200 (e.g., rotating the wheel to which the inflator 200 is attached), and/or changing (e.g., increasing) the voltage or current applied to the battery. However, inflator 200 "wakeup" can be otherwise prompted.

The inflator 200 can begin pairing with nearby gateways 300 and/or user devices 500: automatically, responsive to "wakeup", responsive to an instruction, and/or upon occurrence of any other suitable event. In a first example, the inflator 200 can pair with a gateway 300 to which the inflator 200 has previously been paired (e.g., a gateway 300 with an ID stored on the inflator 200). In a second example, the inflator 200 can pair with a gateway 300 connected to a user device 500 to which the inflator 200 is connected (e.g., in this example, connection to the user device 500 verifies fleet membership). In a third example, the inflator 200 can pair with a gateway 300 connected to the same fleet as the user device 500. In a fourth example, the inflator 200 can pair with a user device 500, then can pair with a gateway 300 responsive to a command from the user device 500 (e.g., the candidate connection is displayed to the user and the user confirms the connection (e.g., example shown in FIG. 14B). However, the inflator 200 can manually or automatically pair with a gateway 300 and/or user device 500 based on any other suitable information or action.

Figure 11A:
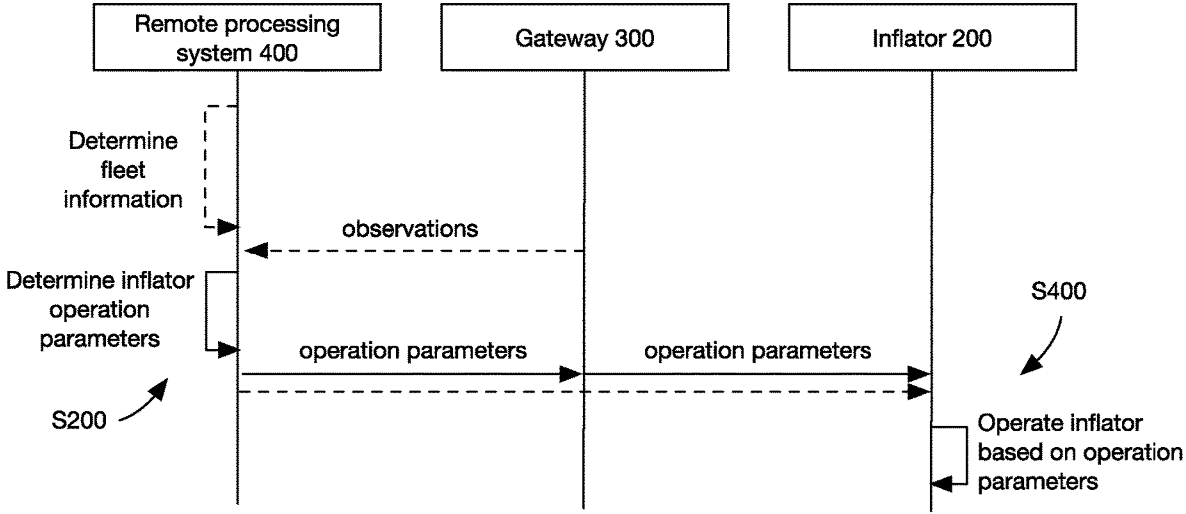
FIGS. 11A and 11B are schematic representations of variants of information flow for determining operation parameters.
Figure 11B:
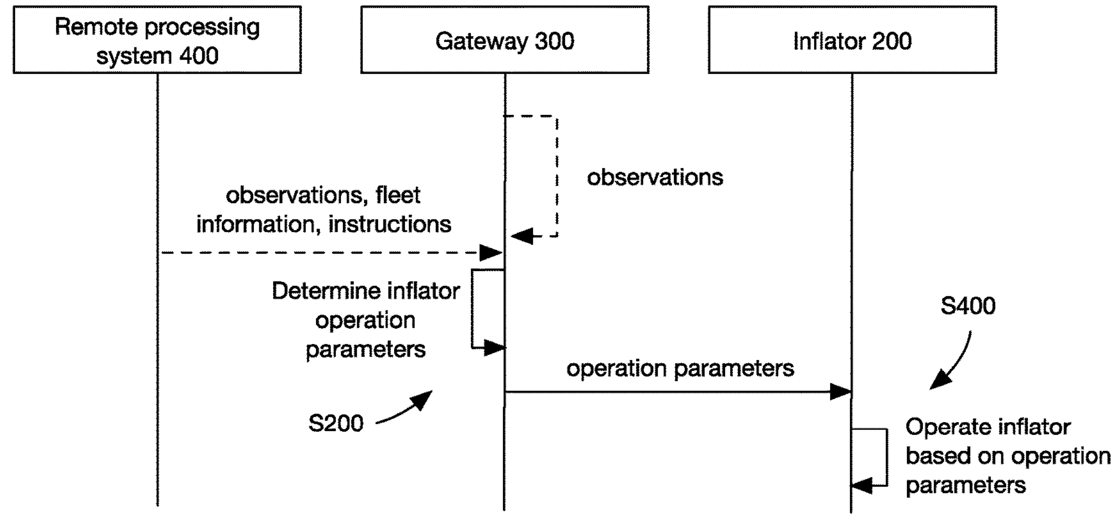

The inflator's configuration can be provided to the inflator 200 during manufacture, installation onto the vehicle, connection to a gateway 300, periodically, and/or at any other suitable time. In a variant where the inflator's configuration is provided to the inflator 200 periodically, the inflator configuration can be used as a heartbeat to monitor the gateway 300 or remote computing system connection. In this variant, if no new configurations are received from the gateway 300, remote computing system 400, and/or fleet management system, the inflator 200 can use an old configuration, halt operation, and/or initiate a failover process. Inflator configurations can be transmitted to the inflator 200 via short- and/or long-range communications. An inflator configuration can be determined manually or automatically. An inflator configuration can be determined by a user (e.g., a fleet administrator), a remote computing system 400 (e.g., example shown in FIG. 11A), a gateway 300 (e.g., example shown in FIG. 11B), a user via a user device 500, the inflator 200 itself, and/or another suitable entity.

An inflator configuration can include inflator ID, vehicle ID, fleet ID, inflator parameters (e.g., age, type, components, etc.), a setpoint set (e.g., a setpoint lookup table, etc.), operation parameters (e.g., a max pump output pressure, a pump flow rate equation, etc.), security credentials, and/or other information. All or portions of the inflator configuration (e.g., operation parameters) can be changed during operation (e.g., during wheel rotation, during a drive session, during inflator operation, etc.), such as by an authorized entity (e.g., the remote computing system 400). At any point during configuration, entities can exchange security credentials. In an example, a set of rotating keys on the user device 500 can rotate in sync with a corresponding set of keys in the cloud, thus verifying the user device's identity to the inflator 200. The inflator 200 can selectively change the security threshold for information exchange and control based on the vehicle motion or operation state. In an example, the inflator 200 can require higher security (e.g., a credential) when the vehicle is in motion. However, the inflator configuration can be otherwise configured.

In variants, configuring the inflator can include connecting the inflator 200 to the gateway 300, optionally connecting the inflator 200 to a remote computing system 400, and receiving an inflator configuration at the inflator 200. Connecting the inflator 200 to the gateway 300 can include verifying each entity's identity to the other, determining a security credential (e.g., a shared key), adding the other entity's ID to a whitelist, exchanging data, and/or another suitable form of connection. In a first variant, the inflator 200 can pair with a gateway 300 using an intermediary device (e.g., a user device 500). In this variant, the intermediary device can be a device already paired or not already paired with the inflators 200. In a specific example, a user device 500 connects to the gateway 300 (e.g., directly or via the remote computing system 400), connects to the inflator 200 (e.g., "waking up" the inflator 200 using an NFC signal), and, responsive to a user input (e.g., confirmation of a candidate pairing displayed to the user), sends a connection instruction to the inflator 200 and/or gateway 300, which exchange information and pair with each other. In a first example, the user device 500 validates the user device's 500 or user's identity with the inflator 200 and establishes a connection between the inflator 200 and gateway 300, which optionally generates a credential for future communications between the inflator 200 and gateway 300. In a second example, a user device 500 establishes a connection with a gateway 300, requests gateway connection information from the gateway 300, establishes a connection with the inflator 200, and sends the gateway connection information to the inflator 200, which can initiate a direct connection with the inflator 200.

In a second variant, the inflator 200 can be directly paired with the gateway 300. In this variant, both the inflator 200 and the gateway 300 can be put in "discovery mode" (e.g., in which both devices search for incoming connection requests while optionally transmitting connection requests). The inflator 200 and gateway 300 can be put into discovery mode directly (e.g., via a user interface on each device) or indirectly (e.g., via a signal from a user device 500 or other entity). In a first example, the inflator 200 can connect to a gateway's network (e.g., a network generated by the gateway 300 or a network to which the gateway 300 is connected) using a network name and password stored on the inflator 200 or received from the user device 500. In a second example, the gateway 300 detects the inflator 200 by proximity (e.g., by connection request signal strength) and transmits a connection request, prompting the inflator 200 to respond with inflator-specific connection information, which the gateway 300 uses to connect to the inflator 200. Alternatively, the gateway 300 can detect the inflator's proximity based on whether the inflator's connection request signal strength is unchanging or whether the signal is still detected while the vehicle is moving.

In a third variant, the inflator 200 can be paired to the gateway 300 by a nearby inflator 200. A nearby inflator 200 can be an inflator 200 on a different wheel or another inflator 200. In a first example, when an inflator 200 is mounted to a wheel and the user puts the inflator 200 into discovery mode, the inflator 200 can detect nearby inflators 200 and automatically connect with the gateway 300 connected to nearby inflators 200. In a second example, unpaired inflators 200 can automatically pair to each other in a mesh, and when a user connects one inflator 200 in the mesh to a gateway 300, all inflators 200 within the mesh automatically pair to the same gateway 300. Optionally, the first inflator 200 can relay the gateway connection information to other inflators 200 in the mesh.

In a fourth variant, the inflator 200 and gateway 300 can communicate without establishing a channel. In an example, the inflator 200 can broadcast a package which the gateway 300 detects and receives. The gateway 300 can optionally verify or decrypt the package using a paired key (e.g., symmetric or asymmetric). When relaying the package to the remote computing system 400, the gateway 300 can decrypt the package and relay the decrypted information; can decrypt the package, re-encrypt the package according to the same or different encryption and relay the re-encrypted information; can not decrypt the package and relay the encrypted information; and/or can perform any other suitable decryption, encryption, and/or other calculations on the received information. In this variant, the encryption key can be specific to the fleet and/or vehicle or can otherwise be specific and/or generic. In this variant, the encryption key can be specific to the fleet and/or vehicle or can otherwise be specific and/or generic.

In a fifth variant, the gateway 300 can automatically detect inflators 200 mounted to the vehicle. In a first embodiment, the gateway 300 pairs with inflators 200 with the strongest signal (e.g., the strongest advertising signal). In a second embodiment, the inflator 200 pairs with inflators 200 based on vehicle motion and signal strength (e.g., pairing with inflators 200 whose signal strength is substantially constant signal strength during vehicle motion). In a specific example, the inflator 200 can send a search signal, the gateway 300 can determine if the inflator 200 is mounted to the vehicle (e.g., prompting a user, using vehicle motion and/or signal strength, and/or using another method), and the gateway 300 and inflator 200 can exchange information and pair with one another.

However, inflators 200 and the gateway 300 can otherwise be paired.

The gateway 300 can optionally differentiate between inflators 200 attached to the vehicle and inflators 200 not attached to the vehicle. In a first variant, the gateway 300 uses signal strength (e.g., connecting to inflators 200 above a threshold strength or connecting to inflators 200 with a constant strength during vehicle motion). In a second variant, the gateway 300 connects to inflators manually specified by a user via a user device 500 or remote computing system 400. In a third variant, inflators 200 on the vehicle can be detected by inference (e.g., using heuristics). In an example of this variant, the gateway 300 can connect to inflators 200 which the gateway 300 can detect even while moving, inflators 200 which are outside of a geofence (e.g., a maintenance yard, etc.), when a threshold number of inflator signals are no longer detected (e.g., connecting to inflators 200 only when "competing" inflators 200 are not nearby), when inflator 200 linear acceleration is roughly equal to gateway linear acceleration and/or by any other heuristic.

Configuring the inflator S100 can additionally include connecting the inflator 200 to a remote computing system 400 (e.g., directly or indirectly). In a variant, a user device 500 can directly or indirectly connect to each component and instruct the two components to connect to each other responsive to user confirmation. In an example, this step can additionally include adding an inflator 200 to a fleet managed at the remote computing system 400.

Receiving an inflator configuration at the inflator 200 functions to provide the inflator 200 with up-to-date operation information. The inflator configuration can be received directly via an inflator communication module 220 from the gateway 300 or a user device 500 or indirectly from the remote computing system 400 via the gateway 300 or user device 500. However, the inflator 200 can otherwise receive an inflator configuration.

Connections between two gateways 300 (e.g., a tractor gateway 300 and a trailer gateway 300) can be additionally created by any of the aforementioned methods for connecting an inflator 200 to a gateway 300. Gateway-to-gateway connections can be created manually or automatically. Gateway-to-gateway connections can be created while the vehicle is moving or while the vehicle is static. Gateway-to-gateway connections can be created directly or using an intermediate device (e.g., a user device 500, inflator 200, and/or remote computing system 400). In an example, gateways 300 can be connected via a wired connection through a CAN bus. In a second example, gateways 300 can be indirectly connected via the remote computing system 400 and/or the user device 500. Gateways 300 can automatically identify and connect with each other, can connect responsive to an event (e.g., upon linkage of a tractor and trailer), can connect responsive to a user prompting (e.g., on a user device 500 or on a gateway user interface directly), and/or can connect by another method. In an example, a tractor gateway 300 emits a connection signal, which prompts a trailer gateway 300 to emit a connection signal. The gateways 300 can exchange information and determine whether the gateways 300 should pair based on vehicle information, a key, signal strength, vehicle motion, and/or other information. The gateways 300 can each communicate to the remote computing system 400, or one gateway 300 can communicate to the remote computing system 400 (e.g., relaying information to the second gateway 300 or to the second gateway's connected inflators 200 directly). The gateways 300 can each have a connection to the remote computing system 400, or one gateway 300 can serve as the connection point to the remote computing system 400 for the other gateway 300, where the gateway 300 connected to the remote computing system 400 can either relay information to the inflators 200 of the other gateway 300 directly or through the other gateway 300.

However, connections between gateways 300 can be created by another suitable mechanism.

Configuring an inflator S100 can optionally include determining the location of the inflator 200 on the vehicle (e.g., the location of the inflator 200 relative to the vehicle; which wheel the inflator 200 is attached to, etc.). In a first variant, the gateway 300 can determine the location of an inflator 200 based on the strength of signals coming from the inflator 200, alignment of the signal strength between antennas 370 (e.g., signals from inflators 200 on the same side of the vehicle may vary strength in sync and signals from inflators 200 on opposite sides may vary strength in opposing cycles), the signal modulation during wheel rotation, and/or determine the inflator location using any other suitable heuristic. In a second variant, the side of the vehicle to which an inflator 200 is mounted can be determined based on the relative rates of pressure between tires 10 on opposite sides of the vehicle (e.g., due to differential amounts of solar radiation heating up the tire 10). In a third variant, the side of the vehicle and/or axle type (e.g., steering axle, driving axle, etc.) can be determined using accelerometer information captured by accelerometers mounted to the inflator 200 and/or wheel (e.g., under the assumption that a wheel will rotate forwards more often than backward, the side of the vehicle can be determined using an acceleration time series, etc.). In a fourth variant, the gateway 300 can receive information about inflator position from the user device 500 (e.g., the user can manually input inflator location). In a fifth variant, the gateway 300 can determine inflator position based on the relative locations of inflators 200 determined by the strength of inflator connection signals received at each other inflator 200. However, the gateway 300 can otherwise determine the location of an inflator 200. Inflator location can be used to determine how information is displayed on a user device 500 or can be used to determine parameters based on relative motion of nearby wheels (e.g., detecting whether a wheel anomaly is wheel-specific or axle-specific, etc.).

However, configuring the inflator S100 can be alternatively performed.

Determining Operation Parameters S200

Determining operation parameters S200 can function to determine the operation parameters for at least one inflator 200 or tire 10. Operation parameters can be a tire pressure setpoint (e.g., target tire pressure), pump setpoint (e.g., target pump reservoir pressure, target pumping rate, etc.), inflator communication rate, pump operation schedule, and/or other pump operation parameters. Determining operation parameters can be performed while the wheel is rotating, while the vehicle is moving, while the wheel is static, responsive to user prompting, responsive to an instruction, and/or at any other suitable time.

Determining operation parameters S200 can be performed independently or cooperatively by the inflator 200 (e.g., the inflator controller 230), gateway 300, remote computing system 400, user device 500, and/or other entities. The entity performing S200 can change based on the operation parameter being determined, based on vehicle operation state, and/or based on any other parameters or factors, or be the same entity in all situations. Determining operation parameters can include using a setpoint determination model to determine setpoints, or otherwise determining the operation parameters. Operation parameters can be determined per-tire, per-inflator, per-wheelset, per-axle, per-vehicle, per-fleet, and/or for any other suitable set of entities.

Operation parameters can be determined based on current and/or historical: fleet data, vehicle parameters, driving context, vehicle operation state, inflator operation state, environmental parameters, tire parameters, vehicle speed, temporal data, fleet preferences, fleet information, vehicle location, vehicle type, load type, load weight, load type, and/or other suitable information. In a specific example, operation parameters are not determined based on current tire measurements and/or inflator measurements. In a second specific example, a setpoint determination model can determine operation parameters based on a prediction of how frequently the vehicle is expected to stop and start in the future based on current and historical vehicle behavior. In a third specific example, a setpoint determination model determines operation parameters based on driving context, wherein the driving context is not based on measurements taken at the wheel or tire. However, operation parameters can be determined based on any suitable information.

The setpoint determination model can be a lookup table, a function, an ML model, an optimization, and/or another suitable setpoint determination process. The setpoint determination model can be determined through any suitable method. The setpoint determination model is preferably executed by the remote computing system 400 but can additionally or alternatively be executed by the gateway 300, user device 500, inflator 200, and/or any other suitable component. The system can use multiple setpoint determination models to run on the same or different components (e.g., inflator controller 230, gateway 300, and/or remote computing system 400) depending on vehicle operation state, inflator operation state, and/or other parameters, utilize a single setpoint determination model, and/or utilize any other suitable number of models.

In a first variant, the setpoint determination model can be a model trained on historical data (e.g., driving context data; vehicle parameters; adverse event data, such a blowout data, fuel efficiency data, puncture data, accident data, etc.) associated with a historical setpoint (e.g., such that the historical setpoint is associated with target fuel efficiency, target blowout risk, target tire wear, etc.) as a training target. In this variant, historical data can be from other inflators 200, other vehicles, vehicles within the same fleet, vehicles within a different fleet, synthetic data (e.g., simulation data), and/or other data. The historical time frame can be all time, a predetermined time window from the present, be a user-specified time window, or be another suitable time window. In an example, a set of features can be extracted from the data (e.g., using a feature extractor, preliminary model layers, etc.) and a setpoint can be determined based on the features. In a specific example, training the setpoint determination model can include extracting features from the historical vehicle parameters or driving context data (e.g., using layers of a model or a non-ML based method) and training the model to predict a set of target setpoints, associated with the historical vehicle parameters or driving context data, based on the extracted features. The determined setpoint can be a binary value, discrete value, or a continuous setpoint value.

In a second variant, the setpoint can be determined using an optimization. In this variant, the objective function of the optimization function can be maximizing fuel efficiency, minimizing tire wear, minimizing blowout risk, minimizing delay, and/or any other suitable objective function. Optimization parameters can be optimized values, manually-input values, and/or can be otherwise determined.

In a third variant, the setpoint determination model can be a lookup table or function, wherein the setpoint can be looked up based on the driving context data, vehicle parameters, tire measurements, and/or other data. In this variant, the setpoint determination model received from a fleet manager, tire manufacturer, inflator manufacturer, and/or another entity. Alternatively, the setpoint determination model can be determined as a proximation of another, more complex function. In an example, the remote computing system 400 determines a complex setpoint determination to run on the cloud and a simpler lookup table to run on the gateway 300 and/or inflator 200.

In a fourth variant, the setpoint determination model can be a proxy model for a more complex machine learning model. In this variant, the machine learning model is determined and/or run on the remote computing system 400 and optionally the gateway 300. The proxy model is determined at the remote computing system 400 and optionally the gateway 300 and is run on the gateway 300 or the inflator 200.

In a fifth variant, the setpoint determination model is a modified version of an existing model based on recent fleetwide tire performance.

The setpoint determination model can be determined based on driving context data, (e.g., location, season, ambient temperature, ambient pressure, ambient humidity, weather, road temperature, road surface type, load, etc.), vehicle parameters, fleet information, and/or other information. The setpoint determination model can preferably be determined without using sensor observations, inflator parameters, and/or tire parameters, but can alternatively use sensor observations, inflator parameters, tire information, and/or other suitable types of information.

Operation parameters can be transmitted via high-power or low-power wireless signals to the inflator(s) 200 and/or other endpoints. Alternatively, operation parameters can be transmitted via a wired connection (e.g., via CAN bus between gateways 300). A combination of transmission methods can be used in parallel or in series. Operation parameters can be transmitted between any two system components. Operation parameters can be transmitted and/or received while the wheel is in motion (e.g., rotating) and/or while the wheel is stationary. In a first variant, operation parameters are determined on the gateway 300 and sent to the inflator 200. In a second variant, operation parameters are determined at the remote computing system 400 and sent to the inflator 200 via the gateway 300 (e.g., using high-power signals for transmission between the remote computing system 400 and the gateway 300 and low-power signals for transmission between the gateway 300 and the inflator 200).

Operation parameters can be received at the inflator 200 via the inflator communication module 220. In a first variant, operation parameters can be transmitted from the remote computing system 400 to the gateway 300 to the inflator 200 (e.g., example shown in FIG. 11A). In a second variant, operation parameters can be transmitted from the remote computing system 400 to the inflator 200 directly. In a third variant, operation parameters can be transmitted from a remote endpoint (e.g., a remote computing system 400, user device 500, gateway 300, etc.) to the inflator 200 via at least one intermediary (e.g., a user device 500, gateway 300, other inflators 200, etc.). Any combination of the aforementioned paths can be used. In a fourth variant, operation parameters can be transmitted from the gateway 300 to an inflator 200 (e.g., wherein the operation parameters are determined by the gateway or received from another endpoint). Preferably, operation parameters are not modified along the path (e.g., by an intermediary); however, operation parameters can alternatively be modified (e.g., decrypted or encrypted, etc.). Multiple entities with differing override powers can determine different operating parameters, and the operating parameters determined by the entity with the highest override power can be used.

Operation parameters can be received at any suitable time. In a first variant, operation parameters can be received at a predetermined rate (e.g., used as a "heartbeat"), responsive to an event (e.g., when a new setpoint is determined, when a vehicle is in a location with a high blowout risk, when the vehicle starts or stops, when the vehicle passes a speed threshold, and/or responsive to any other suitable event), and/or at any other suitable time.

However, determining operation parameters S200 can be alternatively performed.

Monitoring Vehicle State S300

Monitoring vehicle state S300 can function to determine, combine, and/or store information about vehicle operation. Monitoring can be observing (e.g., generating raw sensor data), calculating (e.g., estimating a leak rate based on pump flow and tire pressure), receiving (e.g., the user inputs the tire type during inflator configuration), and/or any other suitable operation.

Monitoring vehicle state S300 can use data (e.g., analysis results) from sensors on the inflator 200, data determined at the gateway 300, data from vehicle mounted sensors (e.g., received at the gateway 300 via CAN bus, etc.), and/or other data. The vehicle state can include whether the vehicle is moving (e.g., vehicle operation state) but can additionally or alternatively be any other suitable vehicle parameter. The vehicle state can include vehicle parameters (e.g., wherein vehicle parameters form a subset of the vehicle state) and/or driving context; alternatively, vehicle state can exclude vehicle parameters and/or driving context.

Monitoring vehicle state S300 is preferably performed based on different data from operation parameter determination (in S200) but can additionally or alternatively be performed using overlapping data or the same data. In an example, S300 is performed using tire measurements and/or inflator measurements, while S200 is not performed using tire measurements and/or inflator measurements. However, both processes can be performed using any other suitable data. S300 can be performed using shared analysis models (e.g., shared across multiple fleets), fleet-specific analysis models (e.g., fleet-specific alerting models), and/or any other suitable set of analysis models.

Figure 12A:
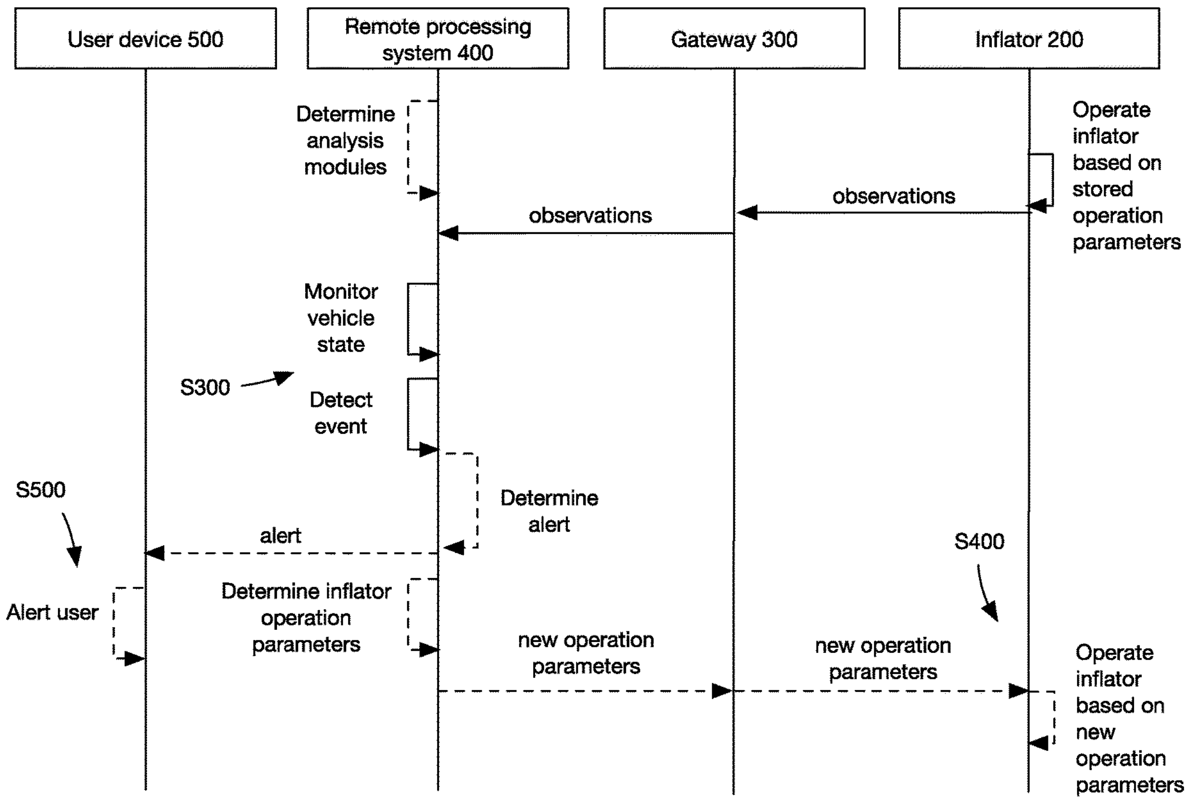
FIGS. 12A and 12B are schematic representations of variants of information flow for monitoring a vehicle.
Figure 12B:
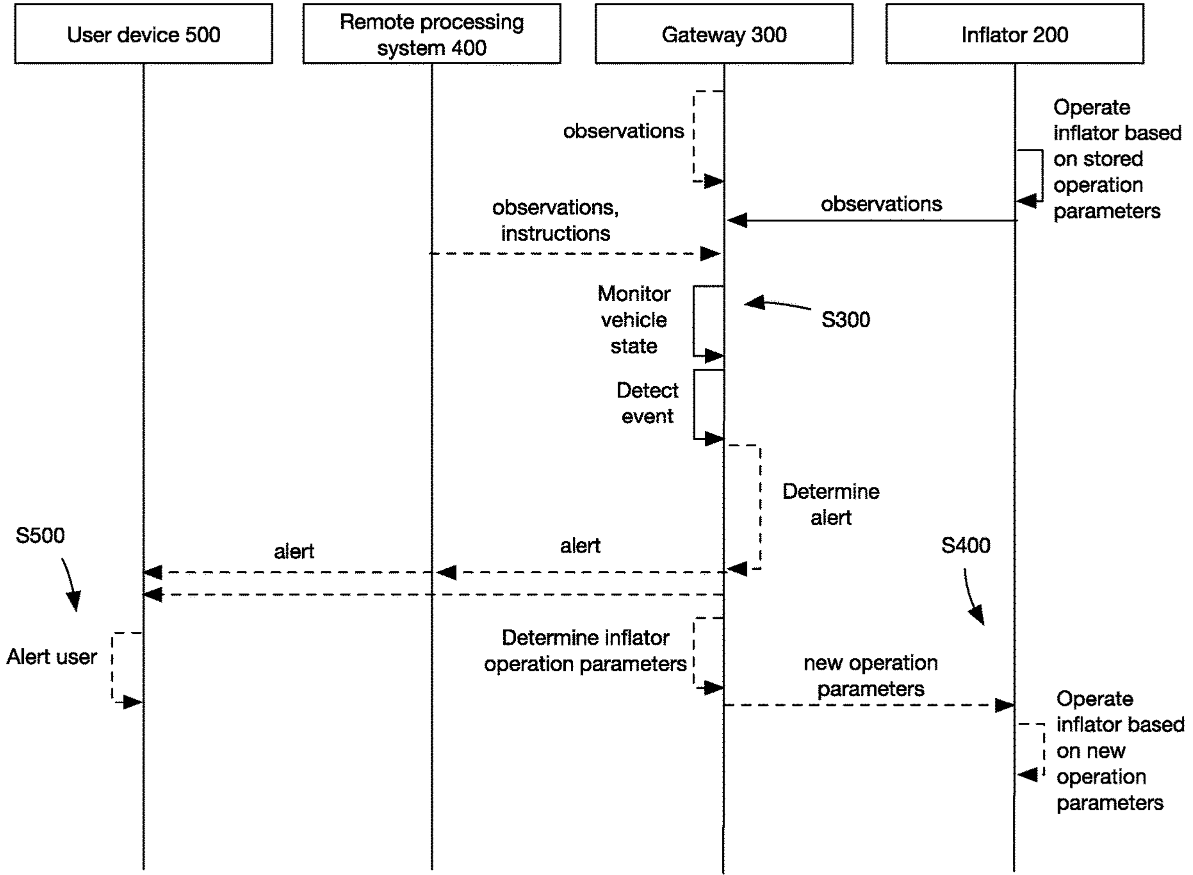

Monitoring vehicle state S300 can be performed by the inflator 200, gateway 300 (e.g., example shown in FIG. 12B), remote computing system 400 (e.g., example shown in FIG. 12A), user device 500, sensors, and/or any other suitable component or combination of components.

Monitoring vehicle state S300 can occur automatically (e.g., periodically, responsive to occurrence of a predetermined event, etc.), responsive to a user and/or system request, and/or at any other suitable time. Monitoring vehicle state can occur when another monitored variable reaches a threshold value, can occur on a schedule (e.g., at a predetermined rate), can occur on vehicle startup, and/or can occur responsive to any other suitable command or signal. Monitoring vehicle state can trigger alerts (e.g., S500, example shown in FIG. 11A and FIG. 11B), can trigger recommendations, can automatically route the vehicle (e.g., routing the vehicle to a maintenance yard and/or deploying a maintenance crew to the vehicle location, etc.), can automatically change an operation parameter (e.g., stop inflator operation when the inflator 200 overheats, etc.), and/or can trigger other suitable actions based on determined vehicle state. Triggers can include parameters exceeding other parameters, exceeding threshold values, and/or more complex analysis on parameters (e.g., using a model to determine blowout risk). In a specific example, responsive to an analysis or set of analyses (e.g., determining tire tread depth, assessing tire health, predictive maintenance, determining tire specification, detecting leaks, or assessing tire performance), an alert (e.g., a user notification) can be sent.

Monitoring vehicle state S300 can include multiple forms of tire and vehicle monitoring.

In a first variant, load weight (e.g., the weight supported by the tire 10) can be monitored. In an example, load weight is determined by a pressure sensor in the vehicle air spring communicatively connected to the gateway 300 via CAN bus or another suitable connection. Alternatively, load weight is input by the user and stored at the gateway 300 and/or remote computing system 400 during the trip. However, load weight can be alternatively monitored.

In a second variant, tire pressure can be monitored. In a first example, tire pressure can be monitored by a pressure sensor in a hose fluidly connecting the inflator 200 to the tire 10. In a second example, tire pressure is monitored by a pressure sensor in the tire 10 itself (e.g., a TPMS sensor wirelessly connected to the inflator 200 and/or gateway 300). However, tire pressure can be alternatively monitored.

Figure 13:
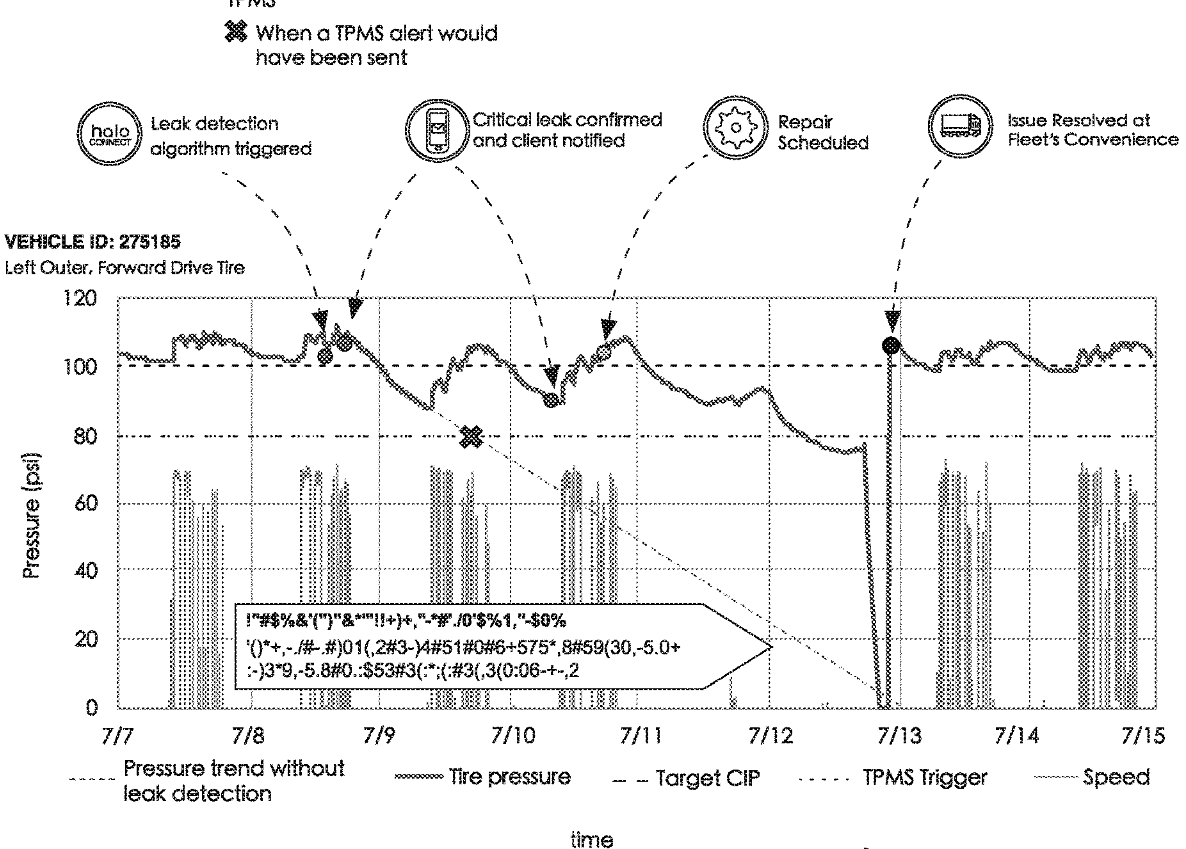
FIG. 13 is an illustrative example of a variant of leak detection.

In a third variant, the tire leak rate can be monitored, and leaks can be detected (e.g., example shown in FIG. 13). In a first example, when the rate of pressure decrease exceeds a threshold value, a leak is detected. In a second example, the leak rate can be determined based on the tire pressure rate of change, pump flow rate, pump output pressure, and other air flow information (e.g., when the monitored values and/or change in the monitored values exceed a predetermined threshold, baseline, or range). In a third example, leaks can be detected when an inflator 200 is pumping more frequently than expected (e.g., where the expected pump rate is based on other tires 10 with a similar make, model, age, tread depth, and/or driving context). In a fourth example, a major leak can be detected when the pump 240 is operating at maximum capacity, but pressure continues to drop. In a fifth example, leaks can be detected through pattern matching based on historical inflator parameters. However, the leak rate can be alternatively monitored.

Figure 6:
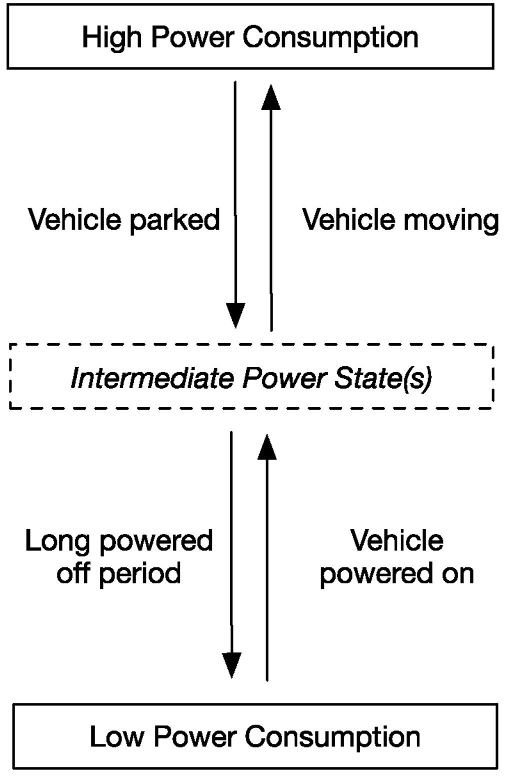
FIG. 6 is a schematic representation of an example embodiment of gateway operation states and transitions.

In a fourth variant, vehicle operation state can be monitored. Vehicle operation state can refer to the motion of a vehicle (e.g., moving, high speed, low speed, reversing, stopped, parked, long parked, dormant and/or any other suitable way to categorize vehicle motion). Vehicle operation state can be determined by the inflator 200, by the gateway 300, and/or by the remote computing system 400 and can be transmitted to other components in the system. In a first example, vehicle operation state can be determined based on motion sampled by a motion sensor (e.g., by a GPS, accelerometer, etc.) on the vehicle, gateway, inflator, wheel, or other component mounted to the vehicle. In a second example, data from a voltmeter or ammeter enables vehicle operation state (and/or gateway operation state, e.g., example shown in FIG. 6) determination based on changing gateway power source current (e.g., changing current from vehicle power source when vehicle turns on). In a specific example, a power change can be detected at an inflator controller 230 when the inflator power source 280 switches from the battery to the generator. In a second specific example, a power change can be detected at a gateway 300 when the vehicle battery starts recharging or exhibits a behavior indicative of vehicle operation state change. In a third example, vehicle operation state can be determined by an incoming signal at the gateway 300 (e.g., from the vehicle CAN bus or from an inflator 200). In a fourth example, vehicle operation state can be determined based on the gateway operation state. However, vehicle operation state can be alternatively monitored.

In a fifth variant, tire tread depth can be monitored. In a first example, tread depth can be determined by a tread depth sensor mounted to the tire 10, where the tread depth sensor is communicatively connected to inflator 200. In this example, the tread depth sensor can have its own battery or can be powered by another source. In a second example, a virtual tire model can estimate tread depth based on tire age, historical road conditions, historical speed, vehicle behavior and load. In a third example, the user device can accept manually-input tread depth measurements (e.g., during routine maintenance) and optionally update a virtual tire model via the user device 500. However, tread depth can be alternatively monitored.

In a sixth variant, tire health can be monitored. In this variant, a virtual tire model which estimates health based on tire age, historical temperature changes, manually-input measurements, historical vehicle behavior, historical tire load, and/or other factors (e.g., received from the inflators 200, vehicle, gateway 300, and/or another local component) can be used. However, tire health can be alternatively monitored.

In a seventh variant, the pump duty cycle can be monitored. In this variant, a model can estimate the duty cycle based on inherent pump parameters, sensor measurements (e.g., a temperature sensor) and the pump's operation history. In an example, the pump 240 exceeding the pump's duty cycle or another parameter exceeding a threshold value can automatically trigger an automatic pump shutoff. However, the pump duty cycle can be alternatively monitored.

In an eighth variant, other advanced diagnostic information (e.g., blowout risk, accident risk, etc.) can be determined. Advanced diagnostic information can be determined based on any suitable available information from the inflator 200, gateway 300, user device 500, and/or remote computing system 400. Advanced diagnostic information can be determined using any method, including ML models, lookup tables, optimization functions, and other suitable methods. However, advanced diagnostic information can otherwise be determined.

In a ninth variant, tire performance can be assessed. Tire performance can represent energy lost at the tire, rolling resistance, ride comfort (e.g., how well the tire absorbs irregularities in the road), tire noise, tire wear rate, tread traction, and/or other suitable types of tire performance. Tire performance can be specific to a specific context (e.g., terrain type, temperature, weather, etc.) or can be context-agnostic. In this variant, tire performance can be determined based on vibrations, tire specification, tire pressure, tire leak rate, fuel efficiency, and/or other factors. In a variant, responsive to a detected low tire performance, an alert can be sent to a user (e.g., S500). However, tire performance can otherwise be assessed.

In a tenth variant, predictive maintenance can be performed. Predictive maintenance can determine measurements of how long until a tire 10, inflator 200, and/or another suitable component needs to be repaired or replaced, and/or determine the type of maintenance that will be required. However, predictive maintenance can refer to other suitable forms of vehicle maintenance, including performance estimates, cost analyses, and other forms of analysis. Predictive maintenance can be based on vehicle parameters, tire parameters, sensor observations, and/or other suitable types of information. Predictive maintenance can be performed using a virtual tire model, a lookup table, a schedule, and/or another suitable method. However, predictive maintenance can be otherwise determined.

However, other vehicle parameters not included in the aforementioned variants can be monitored using any of the methods described in the aforementioned variants.

However, monitoring vehicle state S300 can be otherwise performed.

Operating the Inflator S400

Operating the inflator S400 functions to operate the inflator 200 based on a set of inflator operation parameters (e.g., setpoints) received by inflator communication module 220 (e.g., from gateway 300, user device 500, and/or RCS). Operating the inflator can include inflating the tire, deflating the tire, remaining at the same state and/or transitioning between states. The inflator 200 can be operated using an electric control system but can alternatively be operated using another type of control system.

The operation parameters can be received according to the inflator communication rate, the gateway communication rate, when an operation parameter is determined, at inflator wakeup, at any time described in S200, and/or at any other suitable time.

The operation parameters can be received wirelessly via BLE or another Bluetooth connection, via NFC connection (e.g., from a user device 500 at inflator wakeup), an internet connection (e.g., an LTE connection), via an input interface on the inflator 200, by any of the methods described in S200, and/or by any other suitable method.

The operation parameters can be received directly from the remote computing system 400, received from an intermediary (e.g., a user device 500, a gateway 300 mounted to the vehicle and/or connected to the inflator 200, another inflator 200, etc.), and/or received from any other suitable endpoint. The operation parameters are preferably determined by the remote computing system 400 but can additionally or alternatively be determined by the gateway 300, by the inflator 200, by another inflator 200, and/or by any other suitable system. The operation parameters are preferably specific to the inflator 200 but can alternatively be shared between other inflators 200 of the same vehicle, of the same wheel type (e.g., wheel position, etc.), of the same tire type (e.g., make and model), of the same axle type, of the same fleet, and/or otherwise shared. In an example, different tires 10 and/or inflators 200 of the same vehicle can have (e.g., be assigned) different operation parameters (e.g., drive tire inflators 200 have different operation parameters from steer tire inflators 200; right tire inflators 200 have different operation parameters from left tire inflators 200; interior tire inflators 200 have different operation parameters from exterior tire inflators 200; etc.). The operation parameters can be addressed to the inflator 200, encrypted with a secret or key shared with the inflator 200 (e.g., a symmetric key, an asymmetric keypair, etc.), and/or otherwise specific to the inflator 200; alternatively, the operation parameters can be specific to the vehicle or be nonspecific (e.g., shared across multiple vehicles and/or inflators 200).

Examples of operation parameters that can be used include setpoints, operating ranges, and/or other operation parameters. Setpoints can be treated as targets, minimum values, maximum values, and/or otherwise treated. Examples of setpoints can include: tire pressure setpoints (e.g., a target, maximum, or minimum tire pressure), tire temperature setpoints (e.g., a target, maximum, or minimum tire pressure), inflator setpoints (e.g., pump rate, inflator communication rate, energy harvesting rate, maximum state of charge, valve open/close pattern, etc.), and/or other setpoints. Examples of operating ranges include: tire temperature ranges, tire and/or inflator pressure ranges, pressurized air humidity ranges, wheel rotation rate ranges for inflator operation, and/or other ranges. However, the operation parameters can include any other suitable set of parameters.

Operating the inflator can be performed by the inflator 200 (e.g., locally, by the inflator controller 230, etc.), but can alternatively be performed by the gateway 300, a central control system, by a user device 500, by a user, and/or otherwise performed. Operating the inflator can be performed at any suitable time, including during wheel rotation, while the wheel is static, after receiving a setpoint, while tire pressure is above the tire pressure setpoint, while tire pressure is below the tire pressure setpoint, responsive to a monitored parameter (e.g., the inflator 200 operates at a higher flow rate when a leak is detected), at any subset or combination of the aforementioned conditions, and/or at any other suitable time.

Responsive to receipt of a tire setpoint (e.g., tire pressure setpoint), the inflator controller 230 can change how the inflator operates. Inflator operation can be adjusted: immediately after receipt; during inflator operation; after the vehicle stops; after the vehicle is parked; after a precondition is met; and/or at any other suitable time. Inflator operation can be adjusted in one or more ways. In a first example, the inflator 200 can actuate the pump 240 until the measured tire pressure reaches the setpoint. In a second example, the inflator 200 can actuate a valve separating the tire 10 from a higher-pressure component (e.g., a pump 240 or reservoir) until the tire reaches the setpoint (e.g., open the valve until the tire pressure reaches the setpoint). In a third example, the inflator 200 can set the pump output pressure to the tire setpoint. In a fourth example, the inflator sets the pump output pressure above the tire setpoint. In a fifth example, a drive mechanism 260 driving pump actuation (e.g., a hanging mass, a cam, a solenoid, a motor, etc.) can be selectively operated based on the setpoint (e.g., turned on until the setpoint is reached, then shut off; mechanically coupled to a pump piston until the setpoint is reached, then decoupled; etc.). In a seventh example, the inflator 200 can halt pumping or inflation until the setpoint is met (e.g., the inflator 200 lets the tire leak until the tire pressure meets the tire pressure setpoint). However, the inflator 200 can be operated in another suitable manner based on a tire setpoint.

The inflator 200 can inflate the tire 10 in one or more ways. In a first variant, the inflator 200 can engage the eccentric mass to the pump 240. In a second variant, the inflator 200 can halt the freewheeling of the eccentric mass. In an example, the inflator 200 can halt the freewheeling of the eccentric mass by applying a current to the generator. In a third variant, the inflator 200 can actively actuate the pump 240 or can increase the rate of actuation. In a fourth variant, the inflator 200 can release stored pressurized air into the tire 10. However, the inflator 200 can alternatively inflate the tire 10.

The inflator 200 can halt inflator operation in one or more ways. In a first variant, the inflator 200 can disengage the eccentric mass from the pump 240, halting pump actuation. In a second variant, the inflator 200 can send the mass into a free spin (e.g., where the mass rotates with the wheel and pump 240). In an example, the inflator 200 can send the mass into a free spin by applying a current to the generator. However, the inflator 200 can alternatively halt operation.

The inflator 200 can deflate the tire 10 in one or more ways (e.g., when terrain changes rapidly). In a first variant, the inflator 200 can stop active pressurization and let passive airflow through a minor leak or unsealed valve slowly decrease tire pressure. In a second variant, the inflator 200 can open a valve in the tire 10 to a low-pressure container or ambient air. In a third variant, the inflator 200 can halt inflator operation (e.g., sending the eccentric mass into a free spin or disengaging the eccentric mass) and open a valve in the pump 240 to allow reverse airflow through the pump 240. However, the inflator 200 can alternatively halt operation.

In variants, the inflator 200 can be operated using any of the components and/or methods described in U.S. application Ser. No. 15/280,737 filed 29 Sep. 2016, U.S. application Ser. No. 15/696,816 filed 6 Sep. 2017, and/or U.S. application Ser. No. 16/184,848 filed 8 Nov. 2018, each of which are incorporated in their entirety by this reference; or use any other suitable method.

However, operating the inflator S400 can be alternatively performed.

Sending an Alert S500

Sending an alert S500 can function to send a system signal responsive to detection, prediction, or occurrence of an event. An event can be a tire blowout, pump defect, tire leak, blowout risk, tire installation (e.g., identifying the tire specification) brake failure, tire maintenance, vehicle maintenance, hub failure, security breach, improper inflation, the vehicle entering a high-risk area, the vehicle entering a poor-connection area, a system update becoming available, a fleet message being received, and/or another piece of information worth informing a user or a remote computing system 400 of. In a variant, a system component can determine that maintenance (e.g., tire repair, replacement, etc.) will be needed within a time span and can alert the driver of the vehicle (e.g., via the user device). The events can be determined in S300 and/or otherwise determined. Alerts can be sent from and/or to the inflator 200, gateway 300, remote computing system 400, sensor, and/or user device 500. Alerts can be manually or automatically determined by an alerting model at the remote computing system, gateway, inflator, user device, and/or another suitable system component. In an example, alerts can be determined based on analysis results from analyses performed at the inflator, gateway, remote computing system, user device, and/or another suitable component.

Alerts can prompt a visual alert, audio alert, and/or a vibration. In a first variant, the alert is a notification through an app on the user device 500 or vehicle infotainment system. In a second variant, the alert is the operation of a light (e.g., an LED light) on the gateway 300 and/or another component (e.g., on the trailer, on the inflator 200, in the cab, in the vehicle infotainment system, etc.). Alerts can be additionally sent to a third party (e.g., a nearby tire technician, an emergency response system, police, etc.). Alerts can trigger an operation parameter change (e.g., as described in S300), can trigger inflator operation change (e.g., as described in S400), and/or can prompt a user response at the device (e.g., to approve a tire inflation or replacement recommendation, etc.).

However, sending an alert S500 can be alternatively performed.

However, the method can be alternatively performed.

All references cited herein are incorporated by reference in their entirety, except to the extent that the incorporated material is inconsistent with the express disclosure herein, in which case the language in this disclosure controls.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUS, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A system, comprising:

a local system configured to mount to a vehicle, comprising:

a plurality of tire inflation systems, each configured to statically mount to a respective wheel of the vehicle, wherein each of the plurality of tire inflation systems comprises:

a pump configured to fluidly connect to a tire of the respective wheel;

a set of sensors configured to sample tire measurements; and a processing system comprising a first set of processors configured to control operation of the pump based on a tire pressure setpoint; and a set of vehicle sensors configured to sample a set of vehicle parameters comprising a real-time location of the vehicle; and a remote computing system comprising a second set of processors, remote from the vehicle and configured to:

determine a set of environmental parameters based on the real-time location of the vehicle;

during operation of the vehicle, determine a new tire pressure setpoint based on the set of environmental parameters; and transmit the new tire pressure setpoint to the plurality of tire inflation systems during operation of the vehicle, wherein the pump is dynamically controlled to satisfy the new tire pressure setpoint during operation of the vehicle.

2. The system of claim 1, wherein the new tire pressure setpoint is not determined based on real-time tire pressure measurements.

3. The system of claim 1, wherein the remote computing system is further configured to determine a set of user notifications based on analyses of the tire measurements, wherein the analyses comprise at least one of: tire tread depth, tire health, predictive maintenance, tire specification, leak detection, or tire performance assessment.

4. The system of claim 1, wherein the set of vehicle parameters comprises at least one of: vehicle location, vehicle load, environmental parameter values, tire age, tire model, or vehicle speed.

5. The system of claim 1, wherein the new tire pressure setpoint is determined using a model specific to a fleet of vehicles comprising the vehicle, wherein the model is learned based on historic vehicle performance associated with historic vehicle data from the fleet.

6. The system of claim 5, wherein learning the model comprises: determining a set of target tire pressure setpoints associated with the historic vehicle performance; and training the model to predict the set of target tire pressure setpoints based on the historic vehicle data associated with the historic vehicle performance.

7. The system of claim 1, wherein the local system further comprises a gateway communicatively connected to the remote computing system and each of the plurality of tire inflation systems, wherein the gateway comprises the set of vehicle sensors.

8. The system of claim 7, wherein the gateway connects to each of the plurality of tire inflation systems by detecting the respective tire inflation system during a vehicle drive session.

9. The system of claim 7, wherein the gateway connects to each of the plurality of tire inflation systems based on a strength of signals broadcast by the respective tire inflation system.

10. The system of claim 7, wherein the gateway comprises a first set of communication credentials used for communicating with the remote computing system and a second set of communication credentials used for communicating with the plurality of tire inflation systems.

11. The system of claim 1, wherein each of the plurality of tire inflation systems further comprises a respective housing configured to statically mount to the respective wheel of the vehicle, wherein the pump and the processing system of each tire inflation system are arranged within the respective housing.

12. The system of claim 1, wherein each of the plurality of tire inflation systems comprises a wheel-end tire inflation system statically mounted to the respective wheel of the vehicle.

* * * * *